(12) United States Patent
Moshrefzadeh et al.

(10) Patent No.: US 6,317,263 B1
(45) Date of Patent: Nov. 13, 2001

(54) PROJECTION SCREEN USING DISPERSING LENS ARRAY FOR ASYMMETRIC VIEWING ANGLE

(75) Inventors: Robert S. Moshrefzadeh, Oakdale; Theodore W. Hodapp, St. Paul; Patrick A. Thomas, Maplewood; Hsin-Hsin Chou, Woodbury, all of MN (US); John C. Nelson, The Sea Ranch, CA (US); Patrick R. Fleming, Lake Elmo, MN (US)

(73) Assignee: 3M Innovative Properties Company

( * ) Notice: Subject to any disclaimer, the term of this patent is extended or adjusted under 35 U.S.C. 154(b) by 0 days.

(21) Appl. No.: 09/335,995

(22) Filed: Jun. 18, 1999

(51) Int. Cl.[7] .................................................. G03B 21/56
(52) U.S. Cl. ........................................... 359/443; 359/460
(58) Field of Search .................................. 359/443, 449, 359/460, 458, 455, 456, 457

(56) References Cited

U.S. PATENT DOCUMENTS

| | | | |
|---|---|---|---|
| 2,552,455 | 5/1951 | Pond | 88/28.9 |
| 3,523,717 | * 8/1970 | Glenn, Jr. | 350/123 |
| 4,241,980 | * 12/1980 | Mihalakis et al. | 359/455 |
| 4,431,266 | 2/1984 | Mori et al. | 350/167 |
| 4,666,248 | * 5/1987 | Van De Ven | 350/128 |
| 4,679,900 | * 7/1987 | McKechnie et al. | 350/126 |
| 5,400,177 | * 3/1995 | Petitto et al. | 359/451 |
| 5,457,572 | * 10/1995 | Ishii et al. | 359/457 |
| 5,475,533 | * 12/1995 | Steenblik et al. | 359/628 |
| 6,023,369 | * 2/2000 | Goto | 359/443 |
| 6,163,402 | * 12/2000 | Chou et al. | 359/443 |

FOREIGN PATENT DOCUMENTS

| | | |
|---|---|---|
| 0 783 133 A1 | 7/1997 | (EP) . |
| 56 062238 | 5/1981 | (JP) . |

OTHER PUBLICATIONS

"Optical and Energy Efficiency of Signal Lights" Lewin, et al.; pp. 17–18, 20–25, Jan. 1989.

* cited by examiner

Primary Examiner—Christopher E. Mahoney
(74) Attorney, Agent, or Firm—William D. Miller

(57) ABSTRACT

Rear projection screens include a film layer having a plurality of lenses for diverging light horizontally and vertically. The horizontal viewing angle created by the lenses may be different from the vertical viewing angle. The light may be directed by the lenses in a particular direction, so that the direction of the maximum intensity light does not lie parallel to an axis normal to the screen surface. The lens film may be combined with an isotropic light disperser, such as a bulk diffuser.

47 Claims, 18 Drawing Sheets

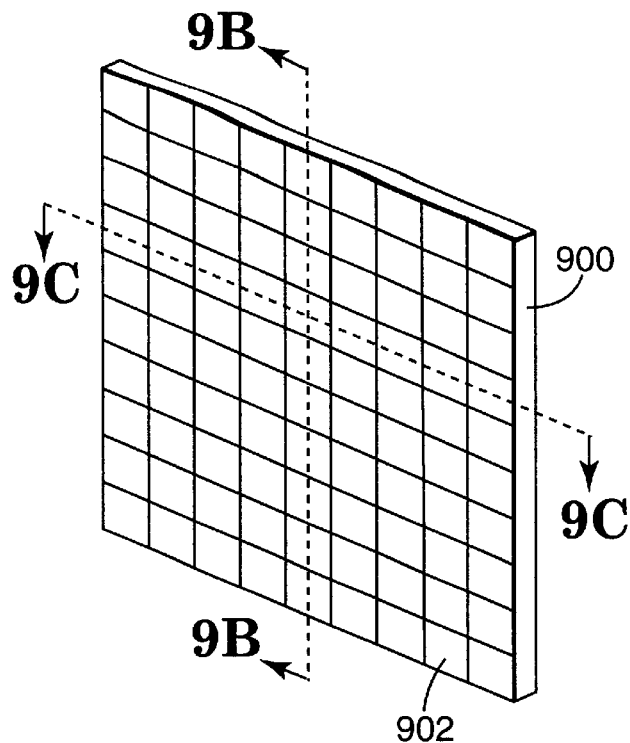
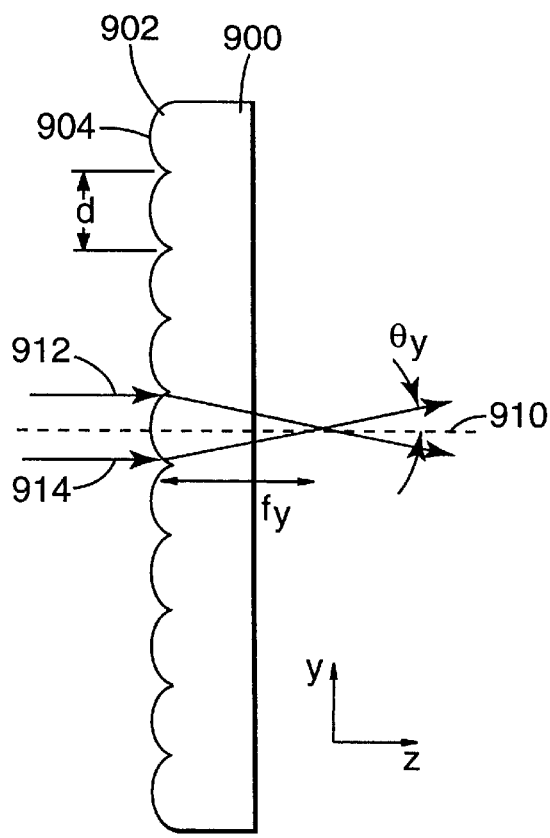
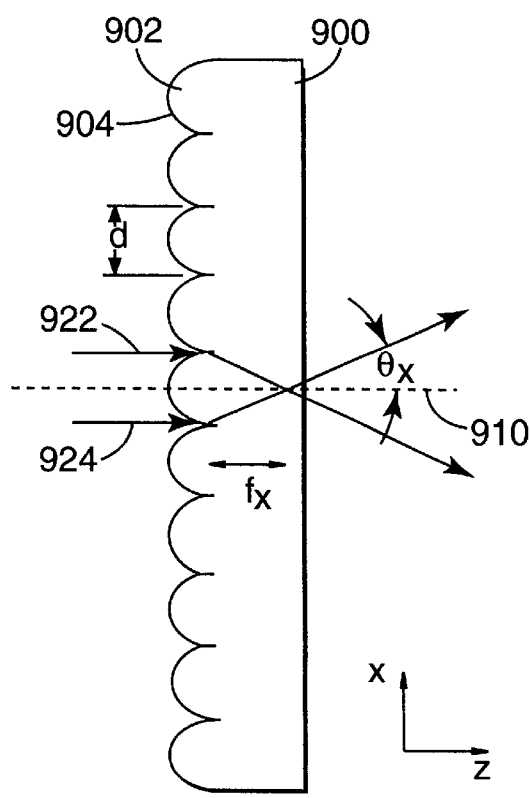
Fig. 9A
Fig. 9B
Fig. 9C

PROJECTION SCREEN USING DISPERSING LENS ARRAY FOR ASYMMETRIC VIEWING ANGLE

BACKGROUND

This invention relates generally to transmissive screens, and more particularly to transmissive screens suitable for use in rear projection systems.

Rear projection screens are generally designed to transmit an image projected onto the rear of the screen into a viewing space. The viewing space of the projection system may be relatively large (e.g., rear projection televisions), or relatively small (e.g., rear projection data monitors). The performance of a rear projection screen can be described in terms of various characteristics of the screen, which typically include gain, viewing angle, resolution, contrast, the presence of undesirable artifacts such as color and speckle, and the like. It is generally desirable to have a rear projection screen that has high resolution, high contrast and a large gain. It is also desirable that the screen spread the light over a large viewing space. Unfortunately, as is described more fully below, as one screen characteristic is improved, one or more other screen characteristics often degrade. For example, in order to increase the screen gain using the same overall structure, one must decrease the viewing angle over which the screen is readily observable. As a result, certain tradeoffs are made in screen characteristics and performance in order to produce a screen that has overall acceptable performance for the particular rear projection display application.

Thus, there remains a need for screens that have improved overall performance while meeting the minimum performance criteria necessary for the rear projection display application in which the screen is used.

SUMMARY

Generally, the present invention relates to rear projection screens that include a film layer having a plurality of lenses for diverging light horizontally and vertically. The horizontal viewing angle created by the lenses may be different from the vertical viewing angle. Furthermore, the light may be directed by the lenses in a particular direction, so that the direction of the maximum intensity light does not lie parallel to an axis normal to the screen surface.

In one embodiment of the invention, a light dispersing screen includes a first film having a first surface, a portion of the first surface defining a plurality of non-lenticular lenses. Light passing through at least one of the non-lenticular lenses is formed into an image and is asymmetrically diverged.

In another embodiment of the invention, a rear projection screen assembly includes a first layer having a first surface, a portion of the first surface defining a plurality of non-lenticular lenses. The screen also includes a symmetric light disperser optically coupled to the first surface to disperse light transmitted by the first layer. Light passing through at least one of the non-lenticular lenses is formed into an image and is asymmetrically diverged.

In another embodiment of the invention, a light dispersing screen includes a first film having light imaging and diverging means thereon for forming an image and for asymmetrically diverging light passing through the first film.

In another embodiment of the invention, a light dispersing film, includes a first film having a first surface, a portion of the first surface defining a plurality of lenses, all of the lenses having dimensions less than one twentieth of a selected dimension of the first film. Light passing through at least one of the lenses is formed into an image and is asymmetrically diverged, and the selected dimension is selected from film length and film width.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 9A illustrates another embodiment of a lens array according to the present invention;

FIG. 9B illustrates a cross-section through the lens array of FIG. 9A;

FIG. 9B illustrates another cross-section through the lens array of FIG. 9A;

Figure 1:
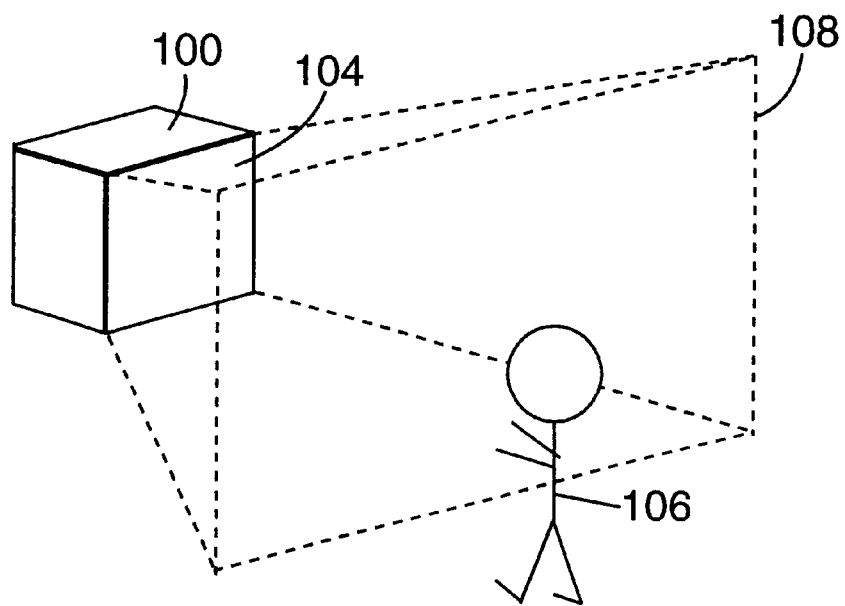
FIG. 1 illustrates a rear projection display.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally applicable to a number of different screen assemblies and is particularly suited to screen assemblies used in rear projection systems.

The present invention is generally applicable to a number of different screen assemblies and is particularly suited to screen assemblies used in rear projection systems. In particular, the present invention is advantageous in applications where the most likely position of the viewer, or viewers, is known: the invention is useful in directing light from all portions of the screen to the most likely viewer position, to increase brightness uniformity across the screen.

A more detailed description of the various screen characteristics is now provided. One important screen characteristic is gain. The gain of a screen represents the screen's brightness as a function of viewing angle. The gain is typically calibrated using an ideal Lambertian reflector with the gain of the ideal Lambertian standard set at 1 for all angles. The peak gain of a screen (or screen element) corresponds to the highest gain at some angle. For example, the peak gain of a bulk diffuser screen, illuminated from behind at normal incidence, is typically observed for the light transmitted through the screen at an angle normal to the screen surface.

Another important screen characteristic is viewing angle. The viewing angle of a screen, as used herein, is the angle at which the gain of the screen drops to half of the peak gain. In many situations, the viewing angle corresponds to the angle at which the intensity of the transmitted image drops to half of the intensity of light transmitted normal to the screen surface.

The particular application of a rear projection system determines the desired viewing angle. It is typically advantageous to direct as much light as possible from the screen to the region where the viewer is most likely to be situated. For example, where the rear projection display is a data monitor, the viewer is typically positioned centrally relative to, and within approximately one to three feet from, the screen. The viewer's eyes may be positioned above a line normal to the center of the screen, but the viewer typically does not view the screen from a distance as much as one or two feet above the screen. Furthermore, for reasons of privacy or security, it may be desirable to reduce the amount of light that emerges from the screen at an angle of e.g. 30° degrees or more relative to a normal to the screen. This reduces the possibility that someone positioned far away from the axis of the screen, and perhaps having no authority to view the contents of the screen, sees the information on the screen.

Another application for a rear projection screen is in a home television system, where it is generally desired to project the image from the screen horizontally over a large angle since it is common for viewers to be seated at a position other than directly in front of the television screen. On the other hand, few viewers view the television screen from a position significantly above or below the screen, and therefore it is commonly desired to reduce the angle in the vertical direction over which the image is transmitted. Accordingly, the viewing angle for a television is typically smaller in the vertical direction than in the horizontal direction. Furthermore, the vertical divergence of the light from a television screen is preferably tilted downwards relative to a normal from the screen. This accommodates, for example, viewers watching the television from the floor. It is not as important to deflect light upwards from the television screen, since viewers typically do not stand to watch television for any length of time.

The rear projection display 100 is described with reference to FIGS. 1, 2A and 2B. The display includes an image projector 102 that projects an image onto the rear side of a screen 104. The image is transmitted by the screen 104 so that a viewer 106, located at some point beyond the screen 104, can see the image 108 projected through the screen 104. The rear projection display 100 may be, for example, a rear projection television, or a rear projection computer monitor, or any other rear projection displaying apparatus.

In accordance with one embodiment of the invention, a liquid crystal display (LCD) based image projector 102 can be used in the rear projection display 100 to project an image onto the rear surface of the screen assembly 104. The rear projection display may vary in size from relatively small data monitors, to large screen televisions and video walls. The projection display 100 may also rely on a folded image projection path within its housing, such as the various projection systems described in European Patent Application EP783133, entitled "Projecting Images", the contents of which are incorporated herein by reference. As will be appreciated from the descriptions below, such systems particularly benefit from the use of the various screen assemblies described herein below.

Figure 2A:
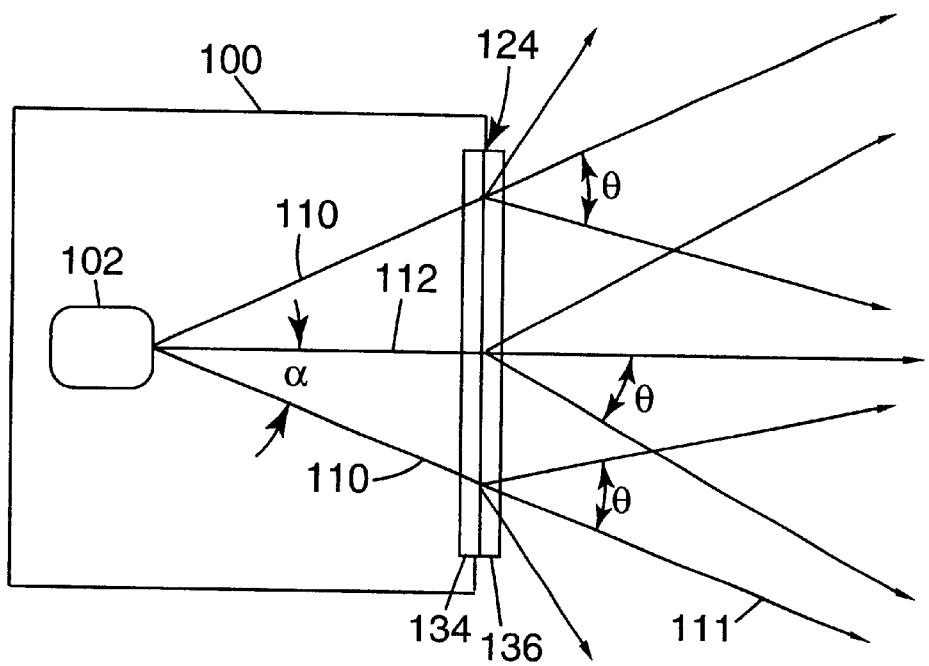
FIG. 2 illustrates a cross-sectional view of one particular embodiment of a rear projection display.

Considering now the illustration of FIG. 2A, the image light 110 produced by the image projector 102 is directed to the screen assembly 124. The screen assembly 124 typically includes several different layers for controlling the image seen by the viewer, including a dispersing layer 134, or layers, and a glass plate 136 to provide support. The dispersing layer 134 disperses, or diffuses, light passing through a particular point of the screen into a cone angle, so that a viewer on the far side of the screen can detect image light from that particular point. It will be appreciated that the dispersing layer 134 typically disperses light from all points across the screen so that the viewer can see the entire image projected onto the screen assembly 124 by the image projector 102.

The on-axis ray of light 112 is dispersed by the dispersing layer 134 to produce a viewing angle of 2θ. The off-axis light rays 110 from the image projector 102 illuminate the edge of the screen assembly 124, and are separated from the on-axis ray 112 by an angle of α. When the off-axis rays 110 pass through the dispersing layer, they are dispersed by ±θ about a ray 111 that is at an angle α relative to a screen normal. It should be appreciated that the viewing angle at the edge of the screen need not be the same as the viewing angle at the center of the screen, since the light dispersing event may be sensitive to the angle of incidence of light from the image light source.

Figure 2B:
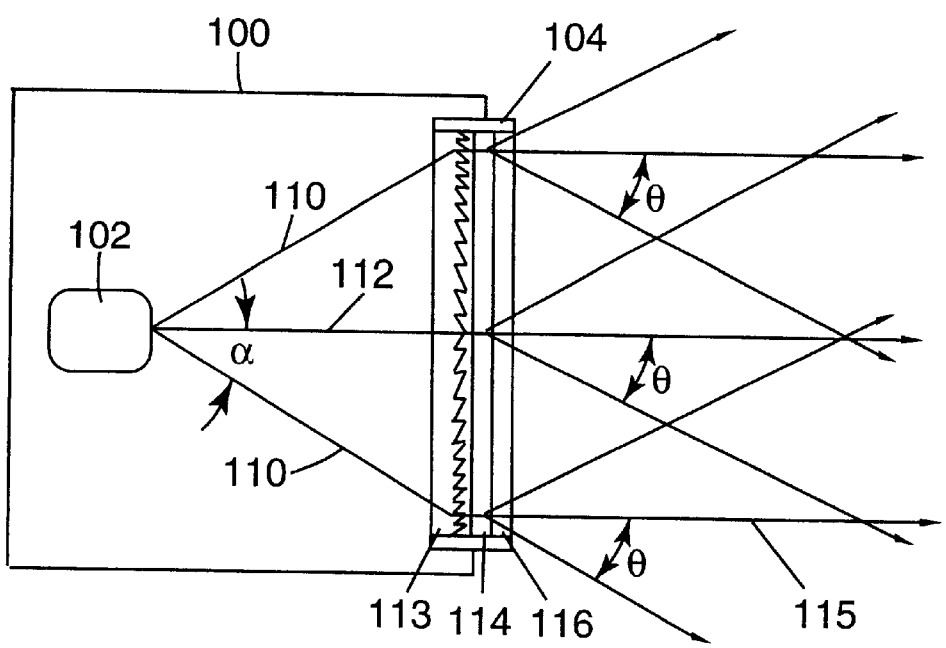

Another screen assembly 104 is illustrated in FIG. 2B, in which light 110 from the image projector 102 is collimated by a Fresnel lens 113 before being incident on the dispersing layer 114. The dispersing layer 114 is supported on a support layer 116, which may be, for example, a glass screen. In this case, the dispersed light transmitted through the edge of the screen 104 is dispersed about a ray 115 that is normal to the screen. One advantage of the screen assembly 104 over the screen assembly 124 without any Fresnel lens is that the angle through which light from the edge of the screen has to be dispersed in order to be detected by an on-axis viewer is reduced. Since the intensity of dispersed light generally decreases with increased angle of dispersion, the image seen by a viewer on the screen assembly 104 having a Fresnel lens typically appears to be more uniformly intense across the screen, than where no Fresnel lens is used.

Figure 3:
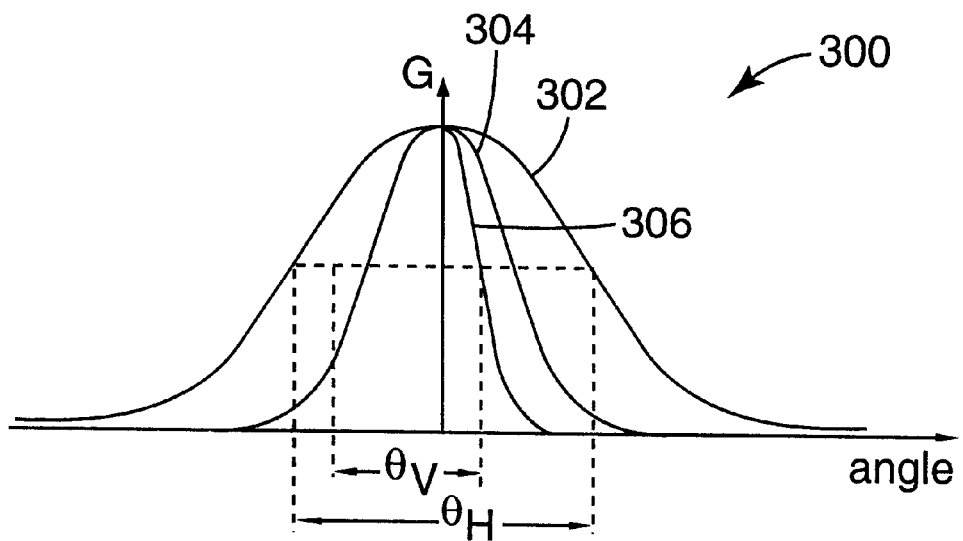
FIG. 3 shows curves of optical gain plotted against angle of view, for vertical and horizontal viewing angles.

One example of a desired gain characteristic for a television screen is illustrated in FIG. 3. The figure illustrates two curves, 302 and 304, that relate gain to angle of viewing, θ, as might be obtained for a screen used in a television. The broader curve 302 illustrates the gain, G, as a function of angle, θ, in a horizontal direction. In other words, this describes the brightness of the screen perceived by a viewer as the viewer moves sideways away from the screen. The horizontal viewing angle, $\theta_H$, is the angle at which the intensity of the horizontally dispersed light falls to half of the on-axis intensity, or to half of the maximum intensity.

The narrower curve 304 represents the dependence of the gain as a function of angle relative to the screen in a vertical direction. As has been discussed above, it is typically desired in a television application that the image from the screen be directed vertically in a relatively narrow range of angles in order to avoid throwing away light that would otherwise illuminate the floor and ceiling, thus increasing the screen brightness perceived by the viewers. In this case, the vertical viewing angle, $\theta_V$, the dispersion angle at which the light intensity is one half of the on-axis intensity, or one half of the maximum intensity, is considerably less than the horizontal viewing angle, $\theta_H$.

Accordingly, it should be appreciated that there are several applications for rear projection display screens in which the viewing angle is not symmetric, in other words, the vertical viewing angle, $\theta_V$, is different from the horizontal viewing angle, $\theta_H$. Also, the viewing angle in one direction, for example the vertical direction, need not be a symmetric function of angle. For example, the gain in the vertical direction may fall more rapidly with increasing angle above the screen axis than for decreasing angle below the screen axis, as is shown for curve 306, which has its peak gain at θ=0°, but sheds more light downwards than upwards.

In the discussion so far, it has been assumed that the maximum brightness of the screen is on-axis. This need not be the case, and the direction of the brightest image may not be on-axis, but may be off-axis.

The divergence of light through the lens may be termed "asymmetric", which means that the divergence in the horizontal direction is different from the divergence in the vertical direction; that the divergence curve is asymmetric, as shown for curve 306; or that the direction of the peak light transmission is not along the direction θ=0°, but is in a direction non-normal to the film surface. The term "asymmetric" may also be applied when any of these three conditions occur in combination.

Figure 4:
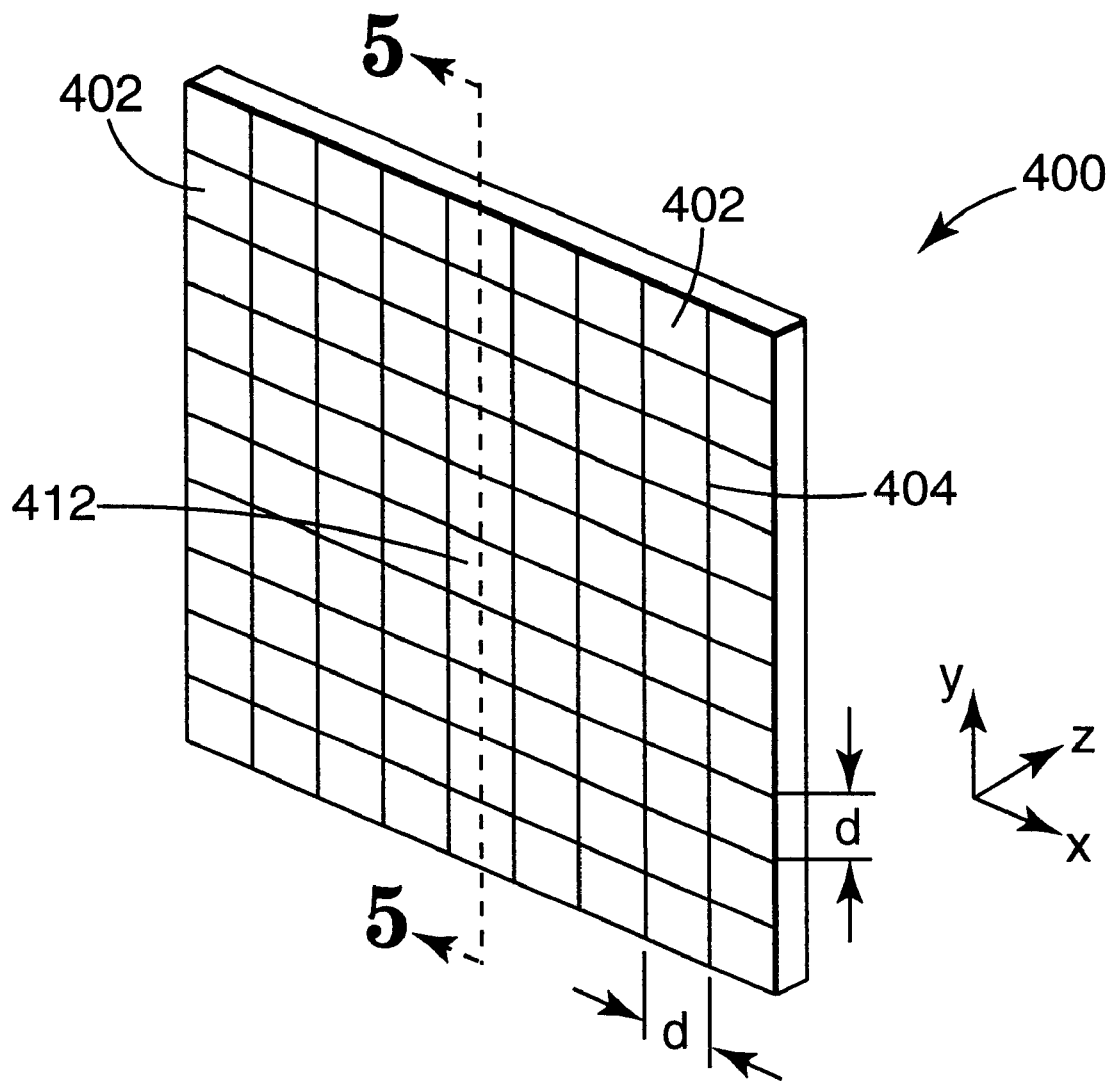
FIG. 4 illustrates one embodiment of a lens array according to the present invention.

The present application is directed to dispersing films for use in a screen assembly, where the dispersing film has a plurality of lenses thereon. The lenses, also known as lenslets, may be arranged in an array pattern on a film 400, as is shown in schematic form in FIG. 4. A number of small lens surfaces 402 are disposed on one side of the film array 400. In this particular example, the lens surfaces 402 are formed in a regular array pattern, although this need not be the case. The term lenslet generally refers to a small lens, but for the purposes of the present discussion, the terms lens and lenslet may be taken to be the same.

The lenses arranged on the film are not lenticular lenses as are commonly used with projection screens. A lenticular lens is typically a cylindrical lens: in other words its curved surface has a finite radius of curvature as measured relative to a first axis and an infinite radius of curvature relative to second axis orthogonal to the first axis. Consequently, a lenticular lens focuses light in one dimension. Some lenticular lenses are not linear across the surface of a film, but are non-linear. However, it is still possible to define points on these lenses where there is a finite radius of curvature relative to one axis and an essentially infinite radius of curvature relative to the orthogonal axis. In contrast, non-lenticular lenses as described here have non-infinite radii of curvature and diverge light in both the horizontal and vertical directions. The dimensions of the lenses, for example length or width, are generally significantly smaller than a length or width of the film. The smaller the size of the lens relative to the film, the higher the resolution afforded by the screen. In many cases, a single lenticular lens extends over the entire height or width of the screen. In contrast, in an embodiment of the present invention the lenses, all of the lenses have a dimension that is less than approximately one twentieth of the screen height or width, and may be substantially smaller still, for example one thousandth of the screen dimension or less.

Figure 5:
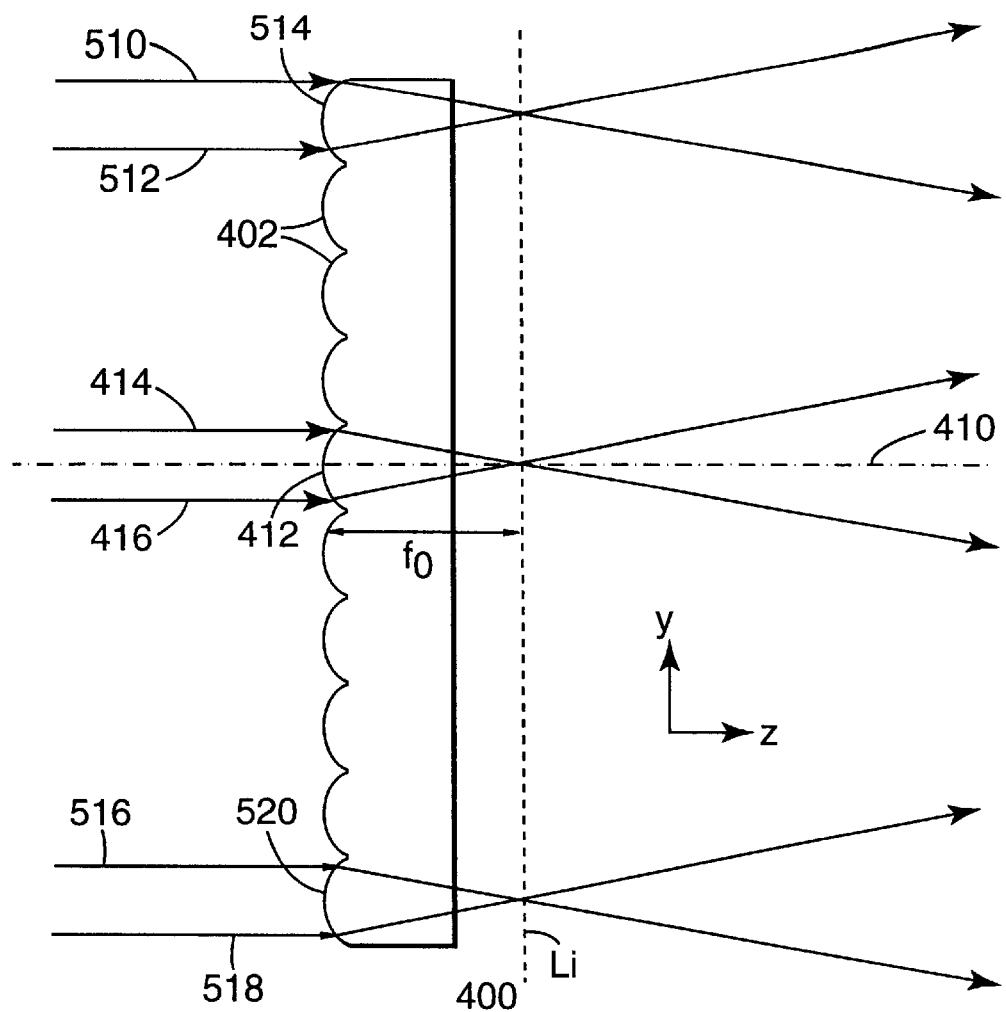
FIG. 5 illustrates a cross-sectional view through the lens array of FIG. 4.

The cross section 5—5 is illustrated in FIG. 5. Each lens surface 402 has a spherical profile, and has a square outline 404. An optical axis 410 lies through one lens surface 412 at a position so that the axis 410 is at normal incidence to the lens surface 412 and to the film 400. The lens surface 412 operates as a lens with a focal length of $f_0$. The axis 410 is, in this case, centrally positioned relative to the surface 412. Two light rays 414 and 416 are illustrated to be normally incident on the film 400 and, after passing through the lens surface 412, each ray 414 and 416 crosses the optical axis 410 at an optical distance separated from the lens surface 412 by the focal length $f_0$.

Additional rays 510 and 512 are shown passing through a lens 514 positioned near the top of the film array 400, and other rays 516 and 518 are shown passing through a lens 520 at the bottom of the film 400. Each lens of the film 400 has a focal length $f_0$ and so the divergence angle is the same for light passing through the different lenses 412, 514, and 520. Moreover, each lens forms an image that is perceived by a viewer in the far field. In the embodiment illustrated, each of the lenses 412, 514, and 520 is a positive lens and, therefore forms a real image. A real image is formed when light passing through a lens is brought to a focus on the output side of the lens. An image plane, Li, may be drawn through the focal points of each lens 402 in the array 400. When all lenses have the same focal length, the image plane is planar, as shown. The lenses 402 in the array 400 may be negative lenses, in which case the lenses 402 form virtual images, i.e., the light diverging from each lens appears to come from an object on the input side of the array 400.

The lenses in the array each form an image, real or virtual, that acts as an object to form an further image in the viewer's eye. The combined effect of all the lenses in the array is that the viewer perceives the entire image projected onto the screen.

Figure 6:
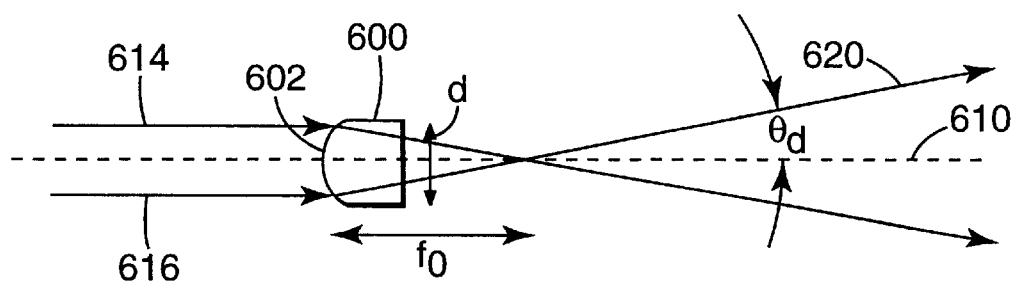
FIG. 6 illustrates optical properties of a single lens equivalent to one lens in the array illustrated in FIG. 4.

The single lens surface 412 may be approximated as a single lens 600 as illustrated in FIG. 6, where the surface 602 is identical to the surface 412. Individual rays 614 and 616 enter the lens 600 and cross the optical axis 610 at the position separated from the curve surface 602 by an optical distance that is equal to the focal length, $f_0$, of the curved surface 602. The lens 600 is square in cross section, similar to each lens 402 on the array film 400. The dimension of the lens 600 is d. The maximally diverging ray 620 produced by the lens 600 results from the collimated ray that enters the lens 600 at a position furthest from the optical axis 610. As a result, the divergence of light produced by the lens 600 is related to both the focal length, $f_0$, and the dimension, d, of the lens. In many cases, the divergence, $\theta_d$, is given by the expression: $\theta_d \approx d/2 f_0$, where $\theta_d$ is the half-angle of divergence.

Figure 7A:
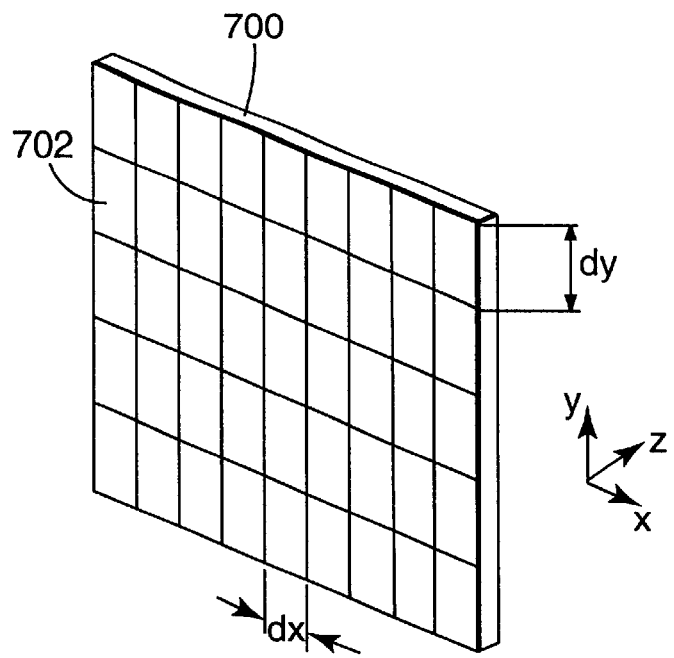
FIG. 7A illustrates another embodiment of a lens array according to the present invention.

The lenses in an array film need not have equal dimensions in the x and y directions. In another particular embodiment of a lens array film 700, illustrated in FIG. 7A, the dimension of the lens in the y direction is $d_y$ and the dimension of a lens 702 in the x direction is $d_x$, where $d_x \neq d_y$.

Figure 7B:
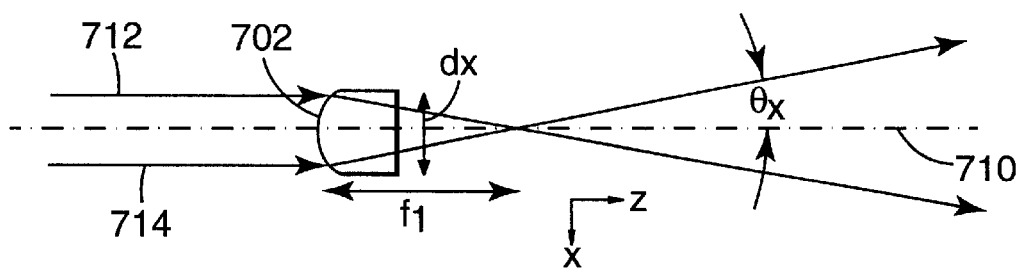
FIGS. 7B and 7C illustrate respective vertical and horizontal cross-sections through a single lens of the lens array illustrated in FIG. 7A.

A single lens 702 of the array 700 is illustrated in FIG. 7B, looking in a direction along the y axis, showing the dimension in the x direction as $d_x$. The image projected onto the film 700 fills the lens 702. Therefore, light rays 712 and 714 enter the lens 702 at its respective upper and lower edges, and diverge from the lens 702 with a divergence angle of $\theta_x$, known as the x-divergence, which may be calculated as: $\theta_x \approx d_x/2f_1$, where $f_1$ is the focal length of the lens 702.

Figure 7C:
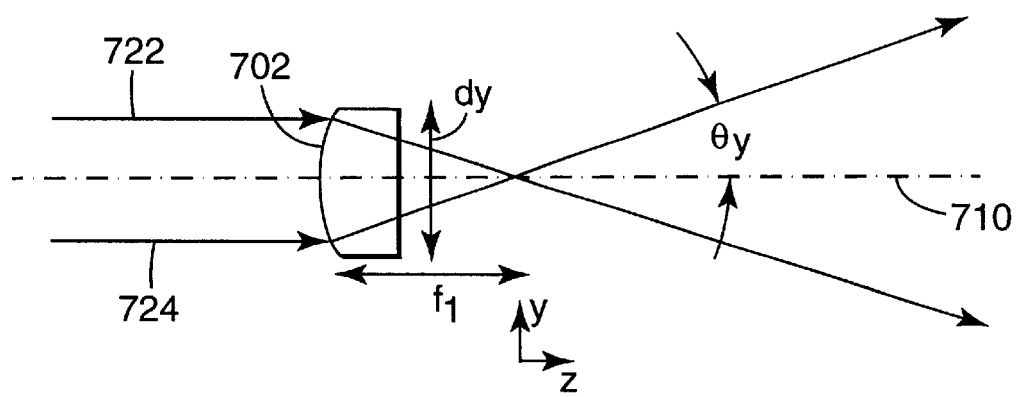

An orthogonal view of the lens 702, looking along the x axis, is illustrated in FIG. 7C, showing the dimension of the lens 702 in the y direction as $d_y$. Light rays 722 and 724 enter at the respective edges of the lens 702, and diverge outwards from the lens at an angle $\theta_y$, known as the y-divergence, where $\theta_y$ is calculated as: $\theta_y \approx d_y/2f_1$. Since $d_y$ is greater than $d_x$, the y-divergence is greater than the x-divergence. Thus, since by $\theta_y \neq \theta_x$, the screen 700 asymmetrically disperses light passing therethrough. This asymmetry arises from the use of lenses having dimensions different in the x and y directions.

Figure 8A:
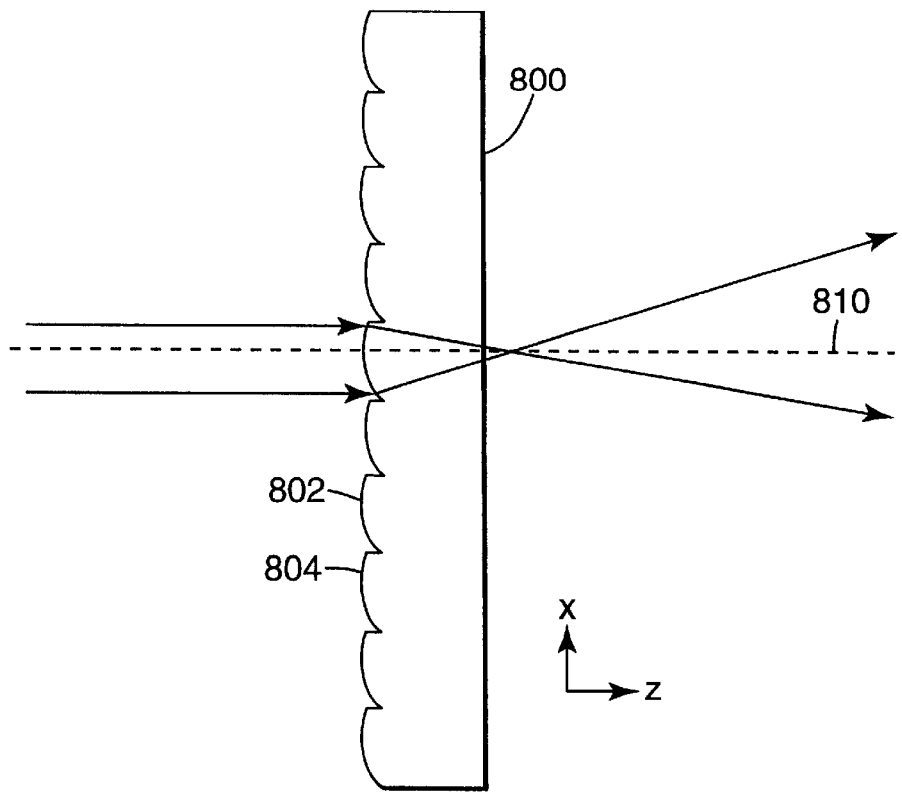
FIG. 8A illustrates another embodiment of a lens array according to the present invention.
Figure 8B:
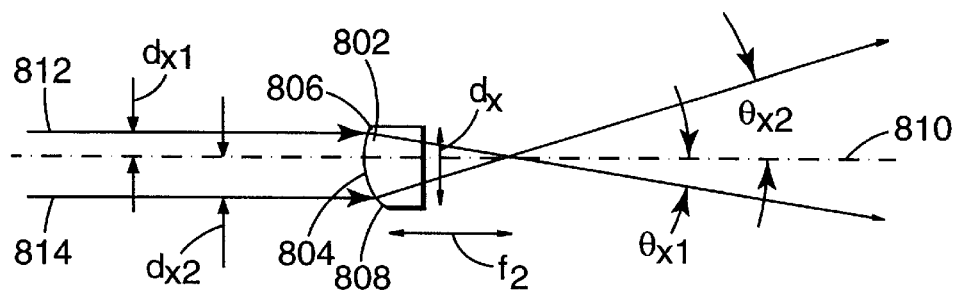
FIGS. 8B and 8C illustrate respective vertical and horizontal cross-sections through a single lens of the lens array illustrated in FIG. 8A.
Figure 8C:
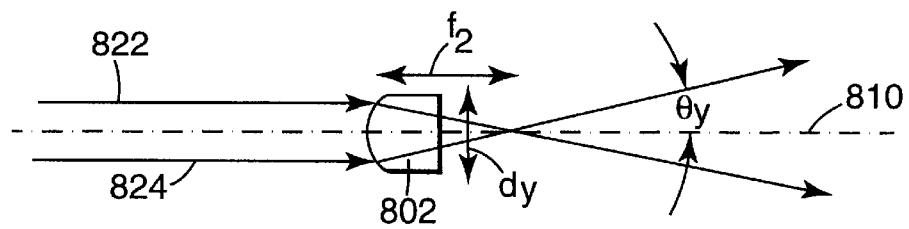

Another lens array film 800 is illustrated in cross-section in FIG. 8A. The film includes an array of lenses 802, each having the same curved surface 804. A cross-section through one lens 802 is illustrated in FIGS. 8B and 8C. The cross-section showing the x-dimension, $d_x$, is illustrated in FIG. 8B. The lens surface 804 is formed so that the optical axis 810 lies offset in the x-direction from the center of the lens 802. The first light ray 812 enters the lens 802 at one edge 806, at a distance separated from the optical axis 810 by $d_{x1}$. The first light ray 812 diverges from the lens 802 at an angle $\theta_{x1}$, which can be calculated from: $\theta_{x1} \approx d_{x1}/2f_2$, where $f_2$ is the focal length of the lens 802. The second light ray 814 enters the lens 802 at the other edge 808, at a distance separated from the optical axis 810 by $d_{x2}$. The lower light ray 814 diverges from the lens 802 at an angle $\theta_{x2}$, which can be calculated from: $\theta_{x2} \approx d_{x2}/2f_2$. Since $d_{x1} \neq d_{x2}$, the light diverges from the lens 802 in a pattern that is not symmetric about the optical axis 810.

The cross-section showing the y-dimension, $d_y$, is illustrated in FIG. 8C. In this case, the lens surface 804 is formed so that the optical axis 810 is centrally positioned relative to the y-direction of the lens. Therefore, each light ray 822 and 824 diverges from the lens 802 at an angle $\theta_y$ given by $\theta_y \approx d_y/2f_2$.

Therefore, the result of using a film having an array of lenses whose optical axes are off-set from the center of the respective lenses results in dispersing light from the film in an asymmetric manner. It will be appreciated, however, that the lens surface may be formed so that the optical axis is off-set from the center of the lens in both the x and y directions.

Another lens array film 900 is illustrated in FIG. 9A. Orthogonal cross-sections through the film 9B-9B and 9C-9C are illustrated in FIGS. 9B and 9C respectively. The film 900 includes an array of lenses 902, each having the same curved surface 904. The lens 902 is astigmatic, in other words it has a different focal length when considering light focusing in the x-z plane and the y-z plane. Consider first the cross-section illustrated in FIG. 9B. The surface 904 is curved in such a manner that the focal length for light focusing in the y-z plane is $f_y$. For the cross-section shown in FIG. 9C, the surface is curved in such a manner that the focal length for light focusing in the x-z plane is $f_x$. The lens 902 is astigmatic where $f_y \neq f_x$.

Accordingly, the divergence of the light in the x-z plane is given by: $\theta_x \approx d/2f_x$, where d is the dimension of the lens 802 in the x-z plane. If we assume the same dimension in the y-z plane, the y-divergence is given by: $\theta_y \approx d/2f_y$. Since the focal lengths are different in each plane, the divergence is different in each plane. The lens 902 may be made astigmatic, for example, by making the radius of curvature of the surface 904 in the x-z plane different from the radius of curvature in the y-z plane.

Accordingly, there are least three approaches available for making the light disperse asymmetrically from a lens array film, namely, changing the dimension of the lenses in one direction relative to an orthogonal direction, off-setting the optical axis of the lens from the center of the lens, and using an astigmatic lens. Of course, it should be appreciated that any of these three approaches may be combined in a single lens array. For example, a lens array may be formed from astigmatic lenses whose optical axes are off-set from their respective center positions. Such lenses could be formed to have outlines with a dimension different in, for example, the x-direction than the y-direction.

Figure 10A:
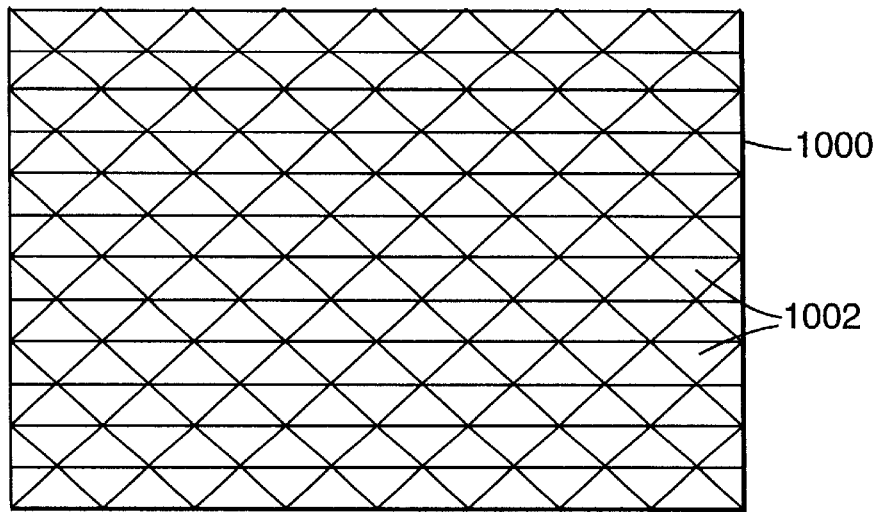
FIGS. 10A–C illustrate different outline forms for lenses in lens arrays according to the present invention.
Figure 10B:
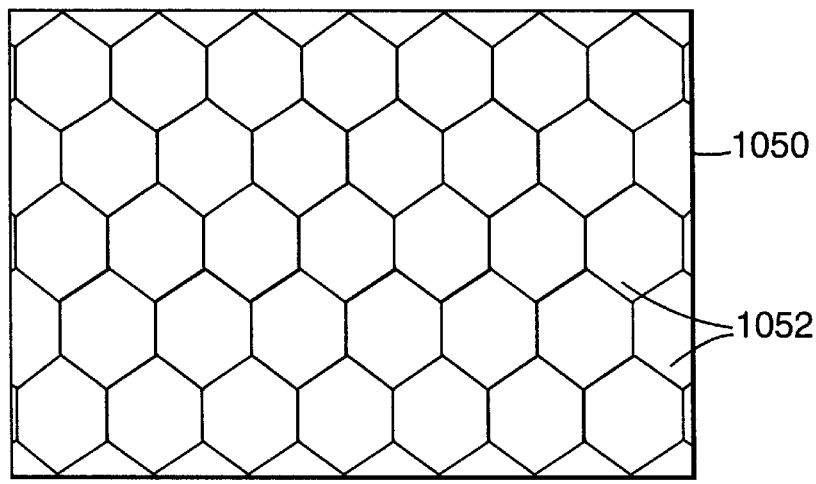
Figure 10C:
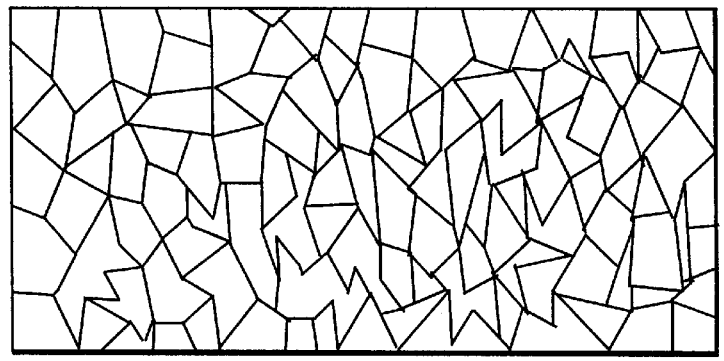

Lenses in an array may be formed from different outline shapes. Typically, the lens outlines are shaped so that there is no space left between any neighboring lenses. Previous examples have illustrated the use of square or rectangular lens shapes. Examples of other shapes are illustrated in FIGS. 10A–10C. In FIG. 10A, the array film 1000 has an array of triangularly-shaped lenses 1002, arranged with the apex of the triangle pointing upwards or downwards. Such an arrangement avoids any unused space between adjacent lenses 1002, thus forming a "tiling" pattern. In FIG. 10B, the array film 1050 has an array of hexagonally-shaped lenses 1052. Hexagons, as seen in the film 1050, may be arranged regularly in a "tiled" pattern to leave no unused spaces between lenses.

Of course, it should be appreciated that irregular patterns of lenses may also be used, where the positioning of one lens relative to the others is not in a periodic pattern.

Furthermore, a single film may include lenses having more than one shape. This is illustrated in FIG. 10C, where the array film 1070 has a pattern 1072 of randomly, or pseudo-randomly, shaped lenses. A random pattern, or pseudo-random, may be used to avoid diffraction effects that typically occur with periodic patterns of lenses.

A lens array film may also be used in conjunction with a light disperser, for example a bulk diffuser, a lenticular layer, a beaded layer, a surface diffuser, a holographic diffuser, a micro-structured diffuser, or various combinations thereof. The disperser disperses, or diffuses, the light, thus destroying any diffraction pattern that may arise from the periodic lens array. The disperser may be positioned before or after the lens array.

Figure 11A:
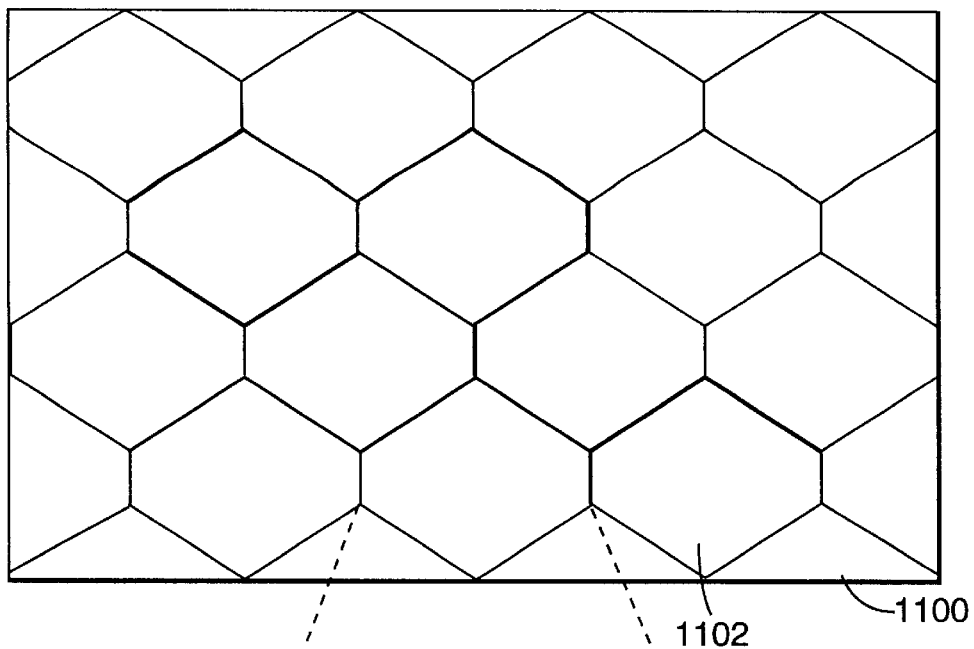
FIG. 11A illustrates an hexagonal outline form for lenses in a lens array according to the present invention.
Figure 11B:
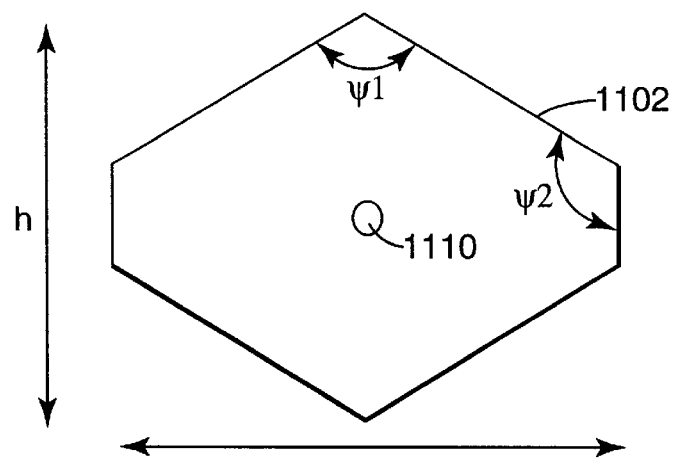
FIG. 11B illustrates a lens having the outline form as shown in FIG. 11A, with an symmetrically positioned optical axis.

Another lens array film 1100 is illustrated in FIG. 11A. In this particular embodiment, the lenses 1102 are shaped as hexagons, having a height dimension, h, and width dimension, w. An expanded view of one such lens 1102 is illustrated in FIG. 11B. The circle 1110 illustrates the position of the optical axis passing through the lens. Here, the optical axis 1110 is positioned at the center of the lens 1102.

Figure 12A:
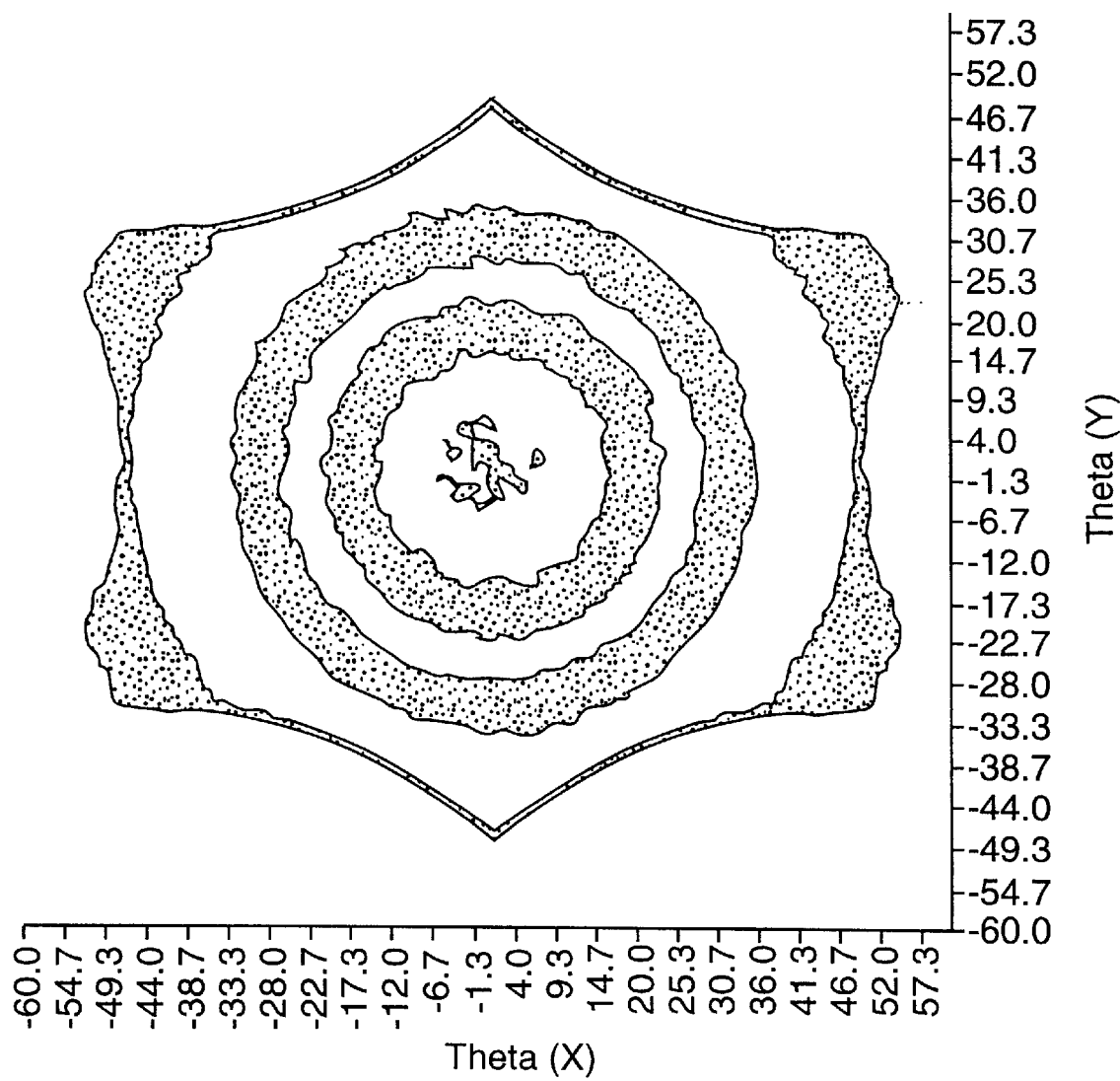
FIGS. 12A and 12B illustrate light intensity patterns produced by lens arrays of lenses the forms of lenses illustrated in FIGS. 11B and 11C respectively.

A light intensity pattern 1200, calculated for light passing through a single lens 1102, is illustrated in FIG. 12A. The contours represent intensity steps, each step about 12% of the maximum intensity. It was assumed that the lens 1102 was formed on a 125 µm thick polycarbonate film. The surface of the lens 1102 was a spherical to reduce spherical aberrations at the focal point, and was non-astigmatic. The focal length was approximately 125 µm, and the lens dimensions were h=w=100 µm. The angles ψ1 and ψ2 were 131.4° and 114.3° respectively. The light intensity pattern is plotted as contours of equal intensity against divergence in the x-z plane, $\theta_x$, and divergence in the y-z plane, $\theta_y$.

Figure 11C:
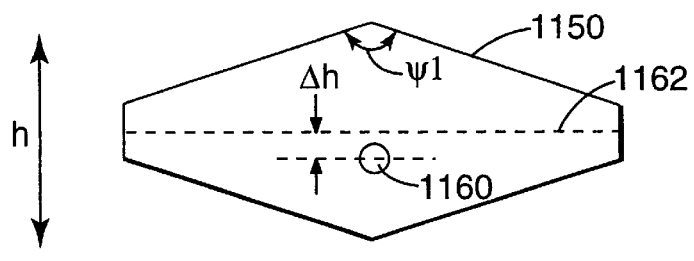
FIG. 11C illustrated a lens having an hexagonal outline form with an optical axis offset from the center of the lens.

Another embodiment of a lens 1152 is illustrated in FIG. 11C. Here, the lens is an oblate hexagon. The optical axis 1160 is not positioned centrally within the lens 1152, but is positioned by an amount Δh below the lens center line 1162.

Figure 12B:
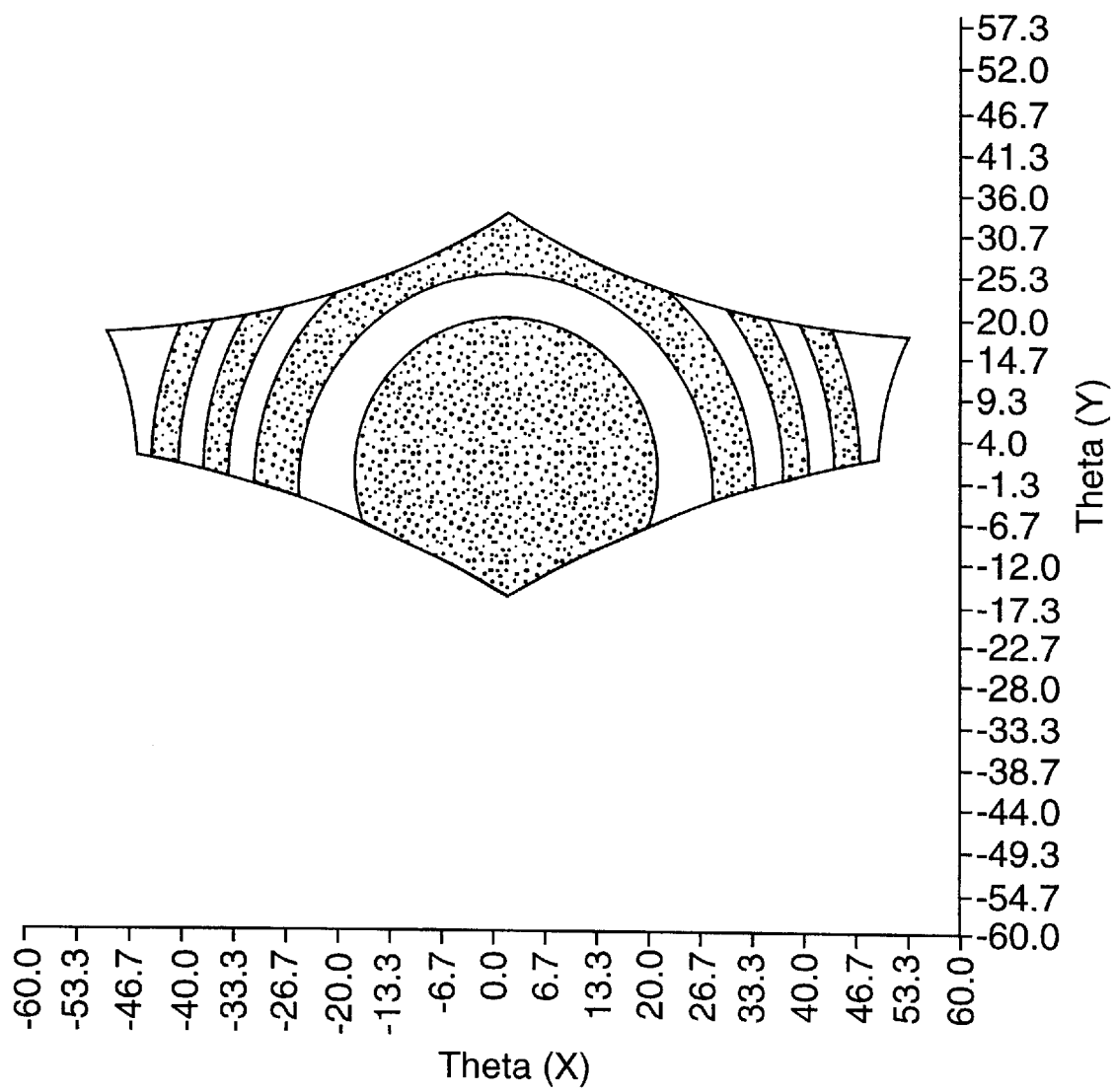

The far-field light intensity pattern 1210 produced by light passing through the lens 1152 is illustrated in FIG. 12B. Each contour represents a step in intensity of about 7% of the maximum intensity. It was assumed that w=100 µm, h=60 µm, and Δh=10 µm. The internal angle, ψ1 was assumed to be 131.4°. The light intensity pattern 1210 is more asymmetric than the pattern 1200 shown in FIG. 12A. In addition to having an intensity pattern whose width is greater than the height, the pattern is directed significantly off axis. The horizontal half-angle, $\theta_x$, is approximately 35°. In the vertical direction, the half-intensity divergence, i.e. the angles to the point of half the maximum intensity, are +32° and −13°. This is a result of off-setting the optical axis from the center of the lens 1152. Further asymmetry may be introduced to the light pattern by using an astigmatic lens.

Figure 13:
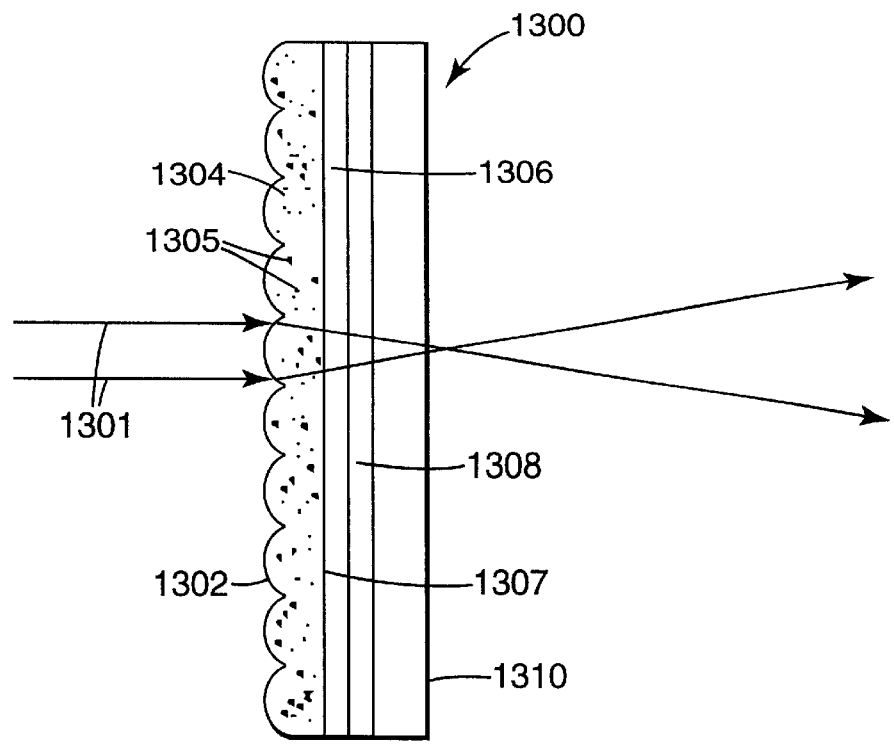
FIGS. 13 and 14 illustrate embodiments of screen assemblies according to the present invention.

The lens array of the present invention may be employed in many different screen constructions. One particular embodiment of a screen assembly 1300 that uses a lens array for dispersing the light passing therethrough is illustrated in FIG. 13. The screen assembly 1300 includes several layers for controlling and dispersing image light 1301 incident on the input face 1302 of the screen assembly. The image light may be either collimated before illuminating the screen assembly 1300, as shown, or may be uncollimated. The first layer is a lens array 1304, for example a lens array of the type described above, where the symmetry of the horizontal and vertical viewing angles is controlled, at least in part, by one of the shape of a lens outline, off-axis lens surfaces, and lens astigmatism. The lens array film 1304 also disperses the light with an integral bulk diffuser formed from particles 1305 having a refractive index different from that of the continuous phase of the array film 1304, the particles 1305 being disposed randomly within the array film 1304. Thus, asymmetric dispersion from the lens array and symmetric dispersion from some other type of disperser may be combined in a single film. Assume, for example, that the bulk diffuser is a 20° disperser, and that the lens array is configured to disperse the image light by ±30° in the x-direction and ±10° in the y-direction. Therefore, after passing through the lens array/bulk diffuser layer 1304, the x-dispersion is, to a first order approximation, ±50° and the y-dispersion is, to a first order approximation ±30°.

Instead of using a bulk diffuser, some other type of disperser may be used. For example, the second surface 1307 of the film 1304 may be formed to include some other form of light disperser, for example a lenticular surface having a period different from that of the lens array, a diffusing surface, a holographic diffusing layer, or a micro-structured diffusing surface, or various combinations thereof. Typically, these dispersers disperse light symmetrically. Furthermore, the second surface of the array film 1304 may be provided with a second array of lenses that is nonperiodic or has a periodicity that varies, or is different from the periodicity of the array on the first surface, so as to reduce diffraction effects.

The next layer 1306 may be a retarding layer that typically is a quarter-wave retarder for a wavelength in the visible region of the spectrum, and the third layer 1308 may be a polarizing layer to absorb light of one polarization and transmit light of the orthogonal, second polarization. The combination of the retarder and the polarizer may be used to reduce the reflection of ambient light, as is discussed in U.S. patent application Ser. No. 09/274,585, titled "Rear Projection Screen With Enhanced Contrast", filed on Mar. 23, 1999, incorporated herein by reference. The polarizer 1308 may be mounted on a glass sheet 1310, which may be, but does not have to be, smoked or treated in some manner to affect its transmission characteristics.

Figure 14:
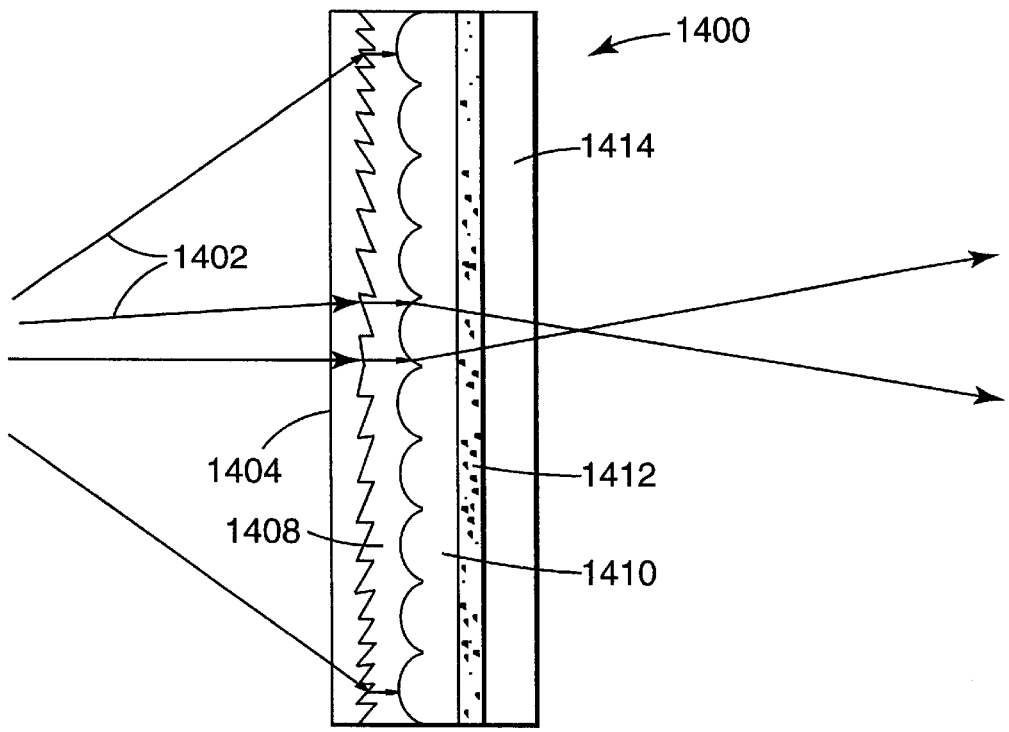

Another screen construction 1400 is shown in FIG. 14. Here, the diverging light 1402 from an image projector is incident on a Fresnel lens 1404, which collimates the light relative to a screen axis. The Fresnel lens 1406 may be embedded in a low refractive index layer 1408, as disclosed in U.S. patent application Ser. No. 09/229,198, filed on Jan. 13, 1999, and incorporated herein by reference. Typically, a Fresnel lens has an air gap between the structured lens surface and the subsequent layers. The low index layer 1408 permits the Fresnel lens 1406 to perform the collimating function, while still permitting the Fresnel lens to approach closely to the other layers of the screen, thus reducing ghost images and enhancing resolution. The lens array film 1410 is located on the second side of the low index layer 1408. The low index layer also provides refractive index contrast so that the Fresnel lens 1404 and the lens array 1410 refract light in the desired manner. Following the lens array film 1410 is bulk diffuser layer 1412, to provide further dispersion and to reduce any diffraction effects that may arise from the lens array film 1410. Dispersion need not be introduced using a bulk diffuser only, and other approaches to introducing dispersion may be used, for example a beaded layer, a surface diffusing layer, a holographic diffusing layer, or a micro-structured diffusing layer, or various combinations thereof. The bulk diffuser may also be replaced by a lenticular array, or another lens array, for example on the output surface of the array film 1410. Where two lens arrays are used, it is advantageous that the first lens array and the second array, the lenticular or lens array, have a period different from that of the input surface of the array film. The bulk diffuser layer may be mounted to a glass sheet 1414 for support.

It should be appreciated that there are many other screen constructions in which the lens array may be used, in addition to those shown here. These illustrations are merely intended to be illustrative of the types of screen that may employ a lens array, and are not intended to be limitative.

Figure 18:
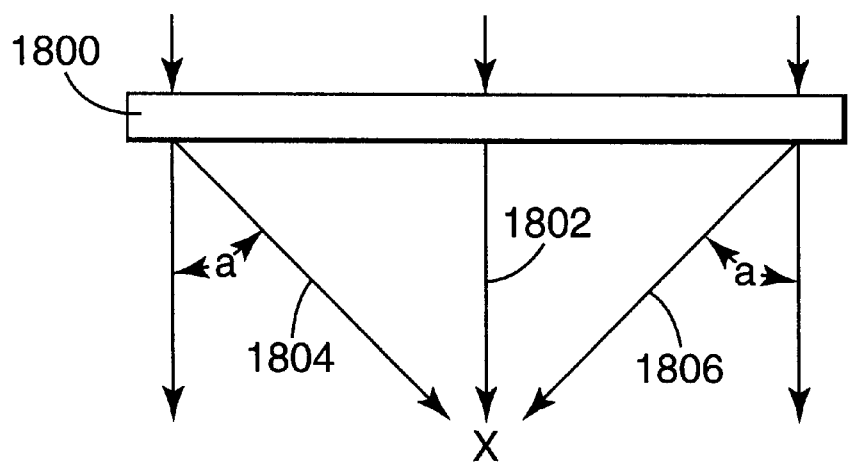
FIG. 18 illustrates light dispersion through a screen for a user positioned close to the screen.

The lenses in an array need not all be uniform, and may differ in many respects, such as size, shape, off-set from optical axis, and focal length. This may be useful where, for example, a viewer is close to the screen 1800, as illustrated schematically in FIG. 18. Here, the light rays 1804, 1806 from the edges of the screen are dispersed through an angle α in order to be viewed by the viewer at position X, whereas the on-axis light 1802 from the center of the screen 1800 is not dispersed by the screen. In general, light passing through a screen without dispersion has a higher intensity than light which is dispersed. Furthermore, the larger the dispersion angle, α, the lower the intensity of the light transmitted by the screen. This becomes an increasingly important effect for large, high resolution computer monitors: the larger the monitor, the larger the angle between the viewer and the edge of the screen, and so it is more likely that the viewer perceives the edge of the screen to be dimmer than the center. The light from the corners of the screen typically has to be dispersed through the greatest angle, and so the corners are often perceived to be the dimmest portion of the screen.

One approach to overcoming this problem is discussed with reference to FIGS. 19A and 19B. Recall from the discussion of FIG. 8B that if a lens is shaped so that the optical axis is offset from the center of the lens, then the light in the far field is deviated in the direction of the offset. Therefore, the lenses in the array 1900 may be arranged so that the optical axis of each lens is offset towards the center of the array 1900. It is assumed that the viewer is sitting with his or her eyes on—axis to the center of the screen. Obviously, if the viewer's position was expected to be elsewhere, then the positions of the axes of each lens would be positioned to direct the light in the direction of the viewer.

Figure 19A:
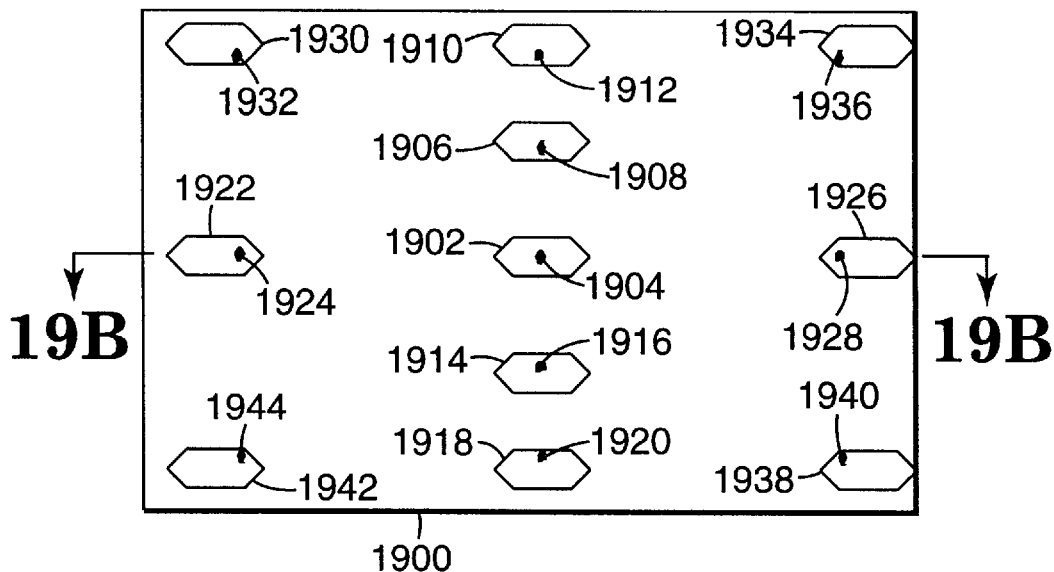
FIG. 19A illustrates a partial view of a lens array having lenses with offset optical axes to direct light towards the screen axis.

FIG. 19A shows a screen 1900 with various hexagonal lenses of a lens array. Not all of the lenses are shown, for clarity. Each lens has an optical axis projecting out of the plane of the figure, and shown as a black dot. The lens 1902 at the center of the screen 1900 has its axis 1904 at the center of the lens 1902. The first lens 1906, positioned upwards from the center, has its optical axis 1908 displaced slightly down from the center of the lens 1906. The lens 1910 at the top of the screen 1900 has its axis 1912 displaced downwards from the center of the lens 1910 by a greater distance than lens 1906.

The first lens 1914 below the center lens 1902 has its optical axis 1916, positioned slightly above lens center, while the lens 1918 at the bottom center of the screen 1900 has its optical axis 1920 positioned upwards from the lens center by a larger amount. The lens 1922, positioned on the left side of the screen 1900 has its optical axis 1924 positioned to the right of lens center, and lens 1926, positioned on the right side of the screen 1900 has its optical axis 1928 positioned to the left of lens center.

The corner lenses 1930, 1934, 1938 and 1942 each have their optical axes 1932, 1936, 1940 and 1944 displaced from lens center in a direction towards the center lens 1902.

Figure 19B:
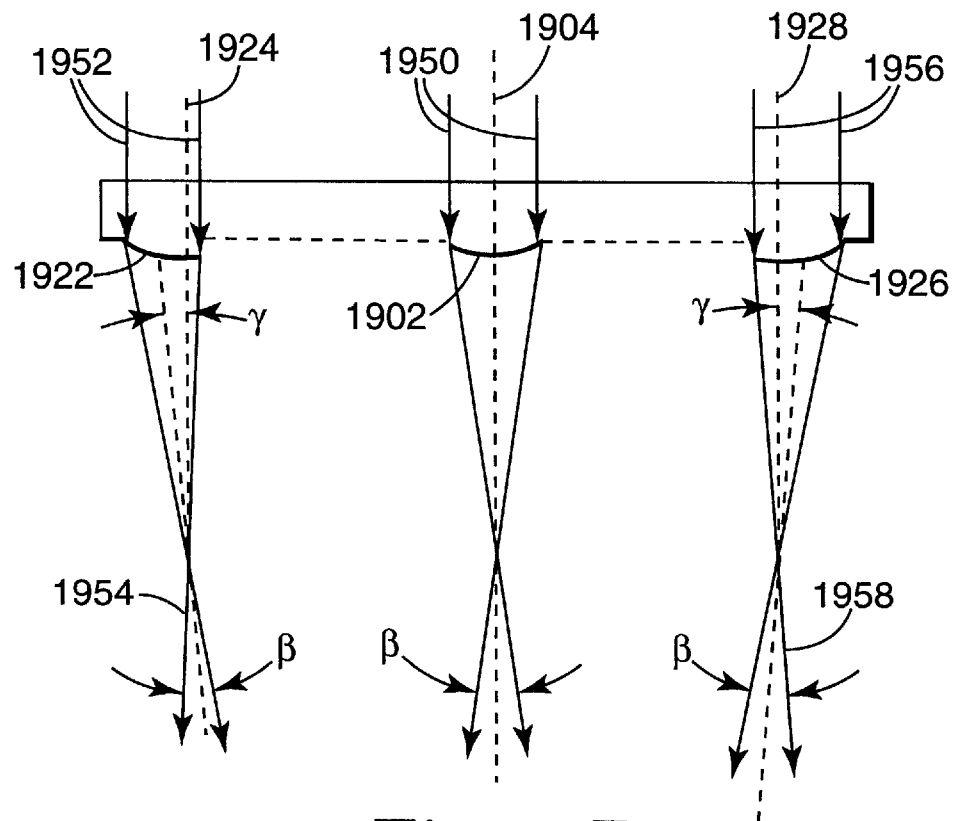
FIG. 19B illustrates a cross-section through the lens array of FIG. 19A.

A cross-section through the screen 1900 is illustrated in FIG. 19B, showing light 1950 passing through the center lens 1902 and being dispersed through an angle β. Note that β represents the full dispersion angle. Light 1952 passing through lens 1922 on the left side of the screen 1900 is also dispersed through an angle β, but the cone 1954 of the dispersed light is directed toward the axis 1904 of the center lens 1902 by an angle γ. Likewise, the light 1956 passing through the lens 1926 on the right side of the screen is dispersed through an angle β, but the cone 1958 of the dispersed light is directed toward the axis 1904 of the center lens 1902 by the angle γ. The value of the angle γ depends, in part, on how much the optical axes 1924 and 1928 are translated from the centers of their respective lenses 1922 and 1926.

It should be appreciated that the amount by which an optical axis is offset in a particular lens not be a symmetrical function of that lens's position in the screen 1900. For example, the net effect of offset optical axes may be to deviate the entire image from the screen 1900 off to the left side or the right side.

Figure 20:
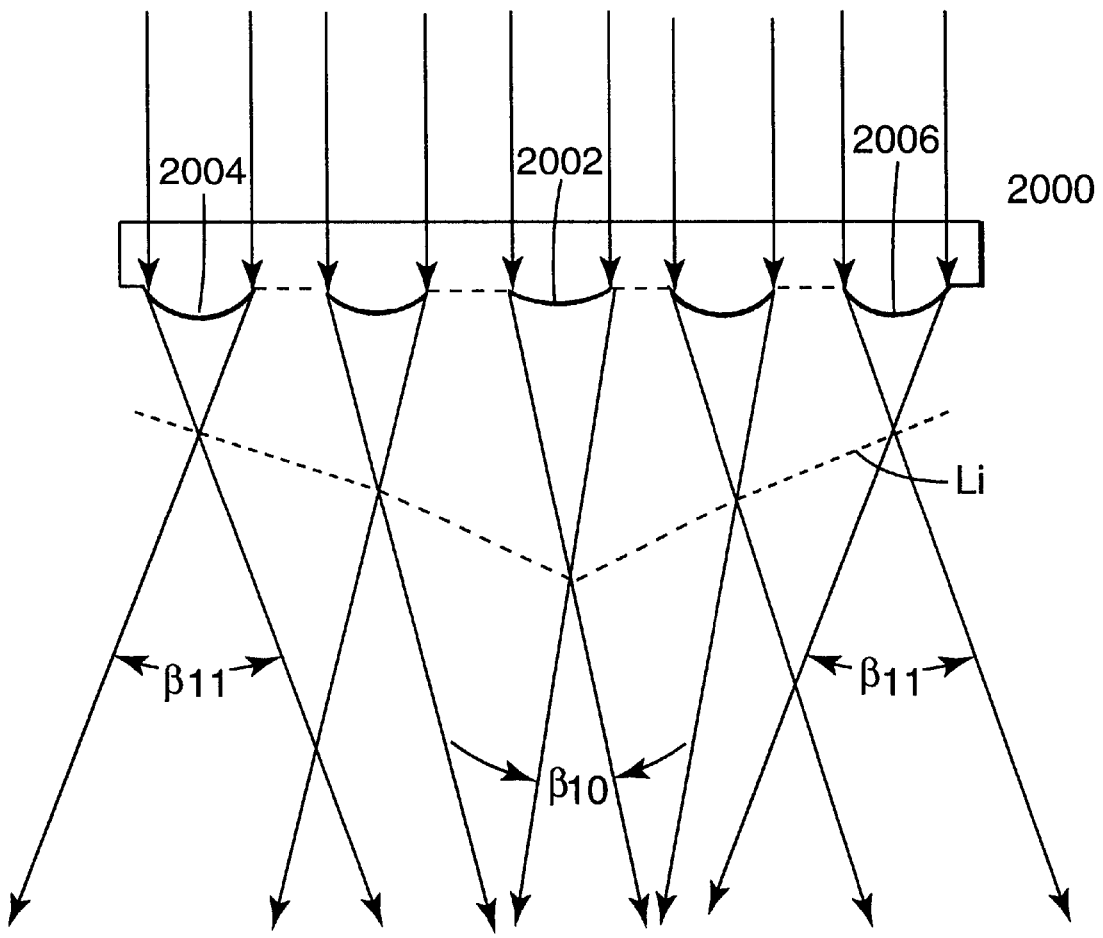
FIG. 20 illustrates a cross-section through a lens array having lenses with different focal lengths.

Another embodiment of a lens array 2000 is shown in cross-section in FIG. 20. Here, the lenses do not all have the same focusing power. For example, the focal length of the center lens 2002 may be $f_{10}$, while the focal lengths of the lenses 2004 and 2006 at the left and right edges of the array 2000 are each $f_{11}<f_{10}$. Consequently, the light is dispersed through a larger cone angle, $\beta_{11}$, at the edges of the array 2000 than the cone angle, $\beta_{10}$, at the center of the array 2000. This embodiment may be used, for example, to direct more light towards a viewer from the edges of the array 2000 in order to reduce any perceived non-uniformity in the intensity across the array 2000 when it is used in a screen assembly. The line Li is drawn through the focus of the lens of the array 2000.

In another embodiment, the lenses close to the center of the screen may hae a shorter focal length than lenses closer to the edge of the screen, so as to reduce the gain in the center of the screen. This may be advantageous where a pixel at the edge of the screen subtends a smaller solid angle relative to the image light source than a pixel in the center of the screen, and so the luminance at the edge of the screen is lower than in the center. In such a case, reducing the gain in the center of the screen may be used to make the brightness of the screen more uniform.

It will be appreciated that the focal lengths of the lenses in the array 2000 may vary for lenses at different x and y positions within the lens array. Therefore, the lenses at the corners of the array 2000 may have the shortest focal length, while the lenses 2002 at the center point of the edges have longer focal lengths. It should further be appreciated that the variations in focal length of lenses across the array need not be symmetrical, but may be asymmetrical if the particular application so demands. Furthermore, it will be appreciated that individual lenses may vary in size as well as focal length, thus further affecting the divergence of light transmitted through the lenses.

One method of fabricating the lens arrays disclosed above is to form a replication master using, for example, laser ablation as disclosed in U.S. patent application Ser. No. 08/429,302, filed on Apr. 26, 1995, and incorporated herein by reference. Following formation of a replication master, a mold may be formed from the master which is then be used to replicate the lens array. In another embodiment, the desired lens array has positive lenses, thus necessitating a replication master with negative depressions. The lens array may be formed directly from the mast, or from a sub-master made from a mold taken from the master. Other approaches may be used to utilize the master.

Figure 15:
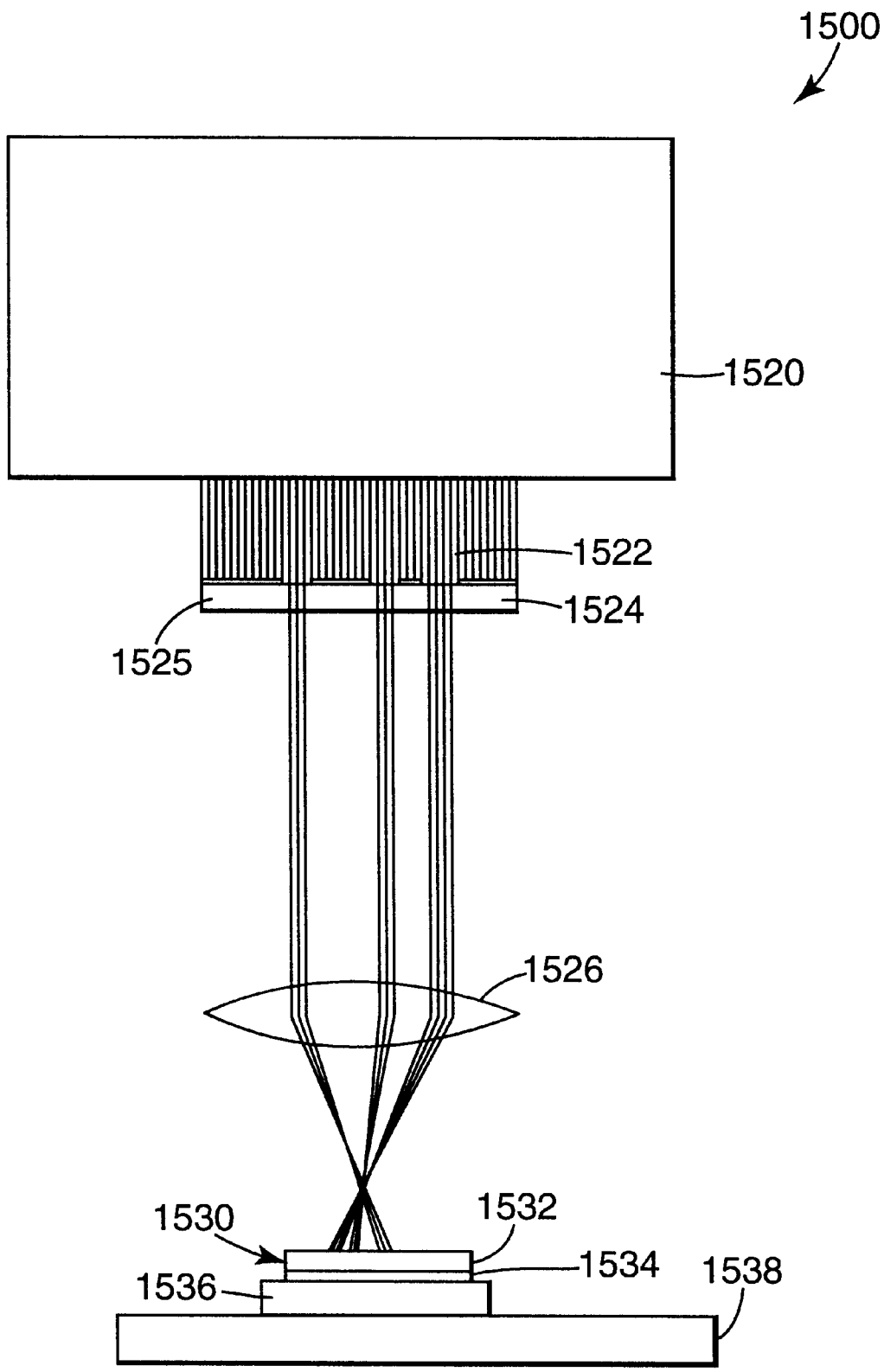
FIG. 15 illustrates apparatus used in forming a molding master for fabricating a lens array according to the present invention.

Apparatus that may be used for forming the replication master using laser ablation is illustrated in FIG. 15. The laser ablation system 1500 may be a laser projection ablation system using a patterned mask, although a shadow mask system or phase mask system may also be used. Direct writing on the master surface may also be used. Ablation is suitable for producing small components or small structures on the surface of the substrate, with the structures having sizes of the order of between one to several hundred microns, if not thousands of microns. Although the ablation technique is illustrated as using a laser light source, other light sources may also be used.

The laser ablation technique involves removing a thin layer from a selected area of the replication master substrate. The area of ablation is selected using a patterned mask. By repeating the ablation process using different masked areas, a structure may be formed on the surface of the replication mass or substrate.

The ablation system 1500 includes a laser, for example, a krypton fluoride excimer laser emitting a beam with a wavelength of approximately 248 nm. Ultraviolet laser ablation is advantageous because of the ability to resolve small features with low levels of collateral damage to the surrounding material surface. Ultraviolet laser ablation is suitable for use with many polymers and ceramics that have high absorption in the ultraviolet region of the spectrum. Furthermore, the absorption length of ultraviolet light is typically very short, which permits the controlled removal of very shallow layers of material.

Ultraviolet light 1522 is emitted by the laser 1520 and illuminates a patterned mask 1524. The mask 1524 may be formed using standard semiconductor lithography mask techniques. The patterned portions of the mask 1524 do not transmit the ultraviolet light, while the support substrate 1525 of the mask 1524 is transparent to the ultraviolet light, and maybe formed from fused silica, calcium fluoride, magnesium fluoride, or some other UV transparent material. Aluminum may be used as the patterning material that forms a pattern of the mask 1524, since aluminum is an effective reflector for ultraviolet light. Alternatively, the mask may be formed using another metal or a patterned reflective dielectric stack.

After propagating through the mask 1524, the ultraviolet light 1522 is focused by an imaging system 1526, that may include a single lens or a more complex optical system having a number of lenses and other optical components. The imaging system 1526 projects an image of the mask 1524 onto the surface of the replication master substrate 1530. The replication master substrate 1530 may be formed from a number of metals, ceramics, polymers or other materials, that are ablatable by ultraviolet light. Examples of suitable polymers include polyimide, polyester, polystyrene, polymethylmethacrylate (PMMA), and polycarbonate. The substrate 1530 may also be formed from a number of layers of different materials, for example, the top layer 1532 may be of polyimide, with the lower layer 1534 being a metal, such as copper. A metal bottom layer may be used as an etch stop or to provide support for patterns that would not be self supporting.

The substrate 1530 is supported on a table 1538 and is held in position on the table 1538 by, for example, a vacuum chuck 1536. The substrate 1530 may also be held in position on the table 1538 using a static electrical method, mechanical fasteners, or a weight. The table 1538 can position the substrate 1530 by moving the substrate 1530 on x, y, and z axis, as well as rotationally, for example, around an axis parallel to the optical axis of the imaging system 1526. The table 1538 is used to move the substrate in small steps, for example as small as 5 nanometers, and may have a reproducible accuracy of the range of 0.1 microns or better. Such a reproducibility allows a step and repeat process to be used with the patterns to allow ablation of larger areas, several feet or more. The table 1538 may be computer controlled to allow programming of movement of the table 1538 as well as possible synchronization of table movement with the emission of light from the laser 1520. The table 1538 may also be manually controlled, for example, using a joystick connected to a computer.

Figure 16:
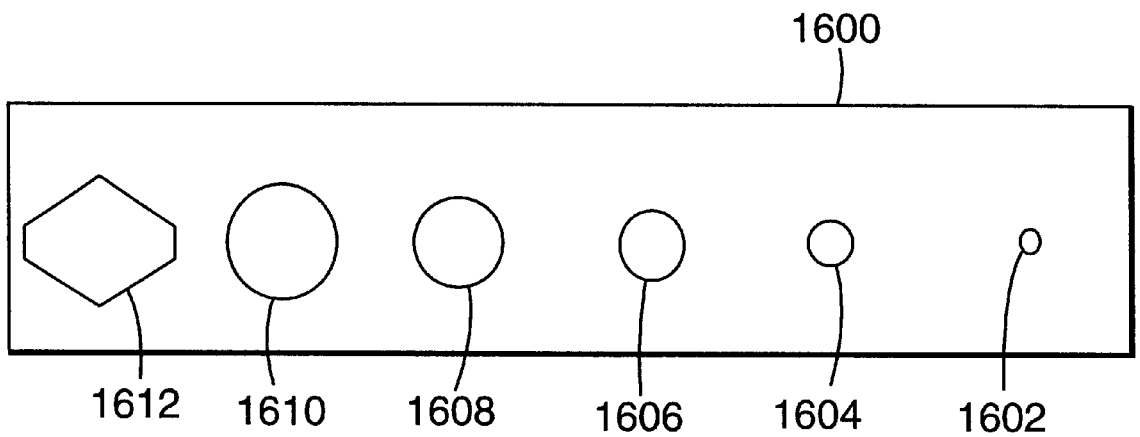
FIG. 16 illustrates a mask for use with the apparatus illustrated in FIG. 15.

The laser ablation system 1500 may be used to create a repeated ablation pattern on the substrate using a step and repeat process. FIG. 16 illustrates an example of a pattern mask that may be employed for ablating a pattern of hexagonally shaped lenses as illustrated in FIG. 11A. It should be appreciated that a number of different shapes and geometries may be employed in a pattern mask, such as squares, circles, channels, polygons and the like, or irregular shapes, to create an array of lenses on the replication mask or substrate. In the illustrated case, the mask 1600 has a number of apertures to transmit the ultraviolet light from the laser. The apertures 1602, 1604, 1606, 1608, 1610, and 1612 are arranged along the mask 1600 with equal spacing between each aperture. A method of exposing a replication master using the mask 1600 is illustrated in FIGS. 17A to 17F.

Figure 17A:
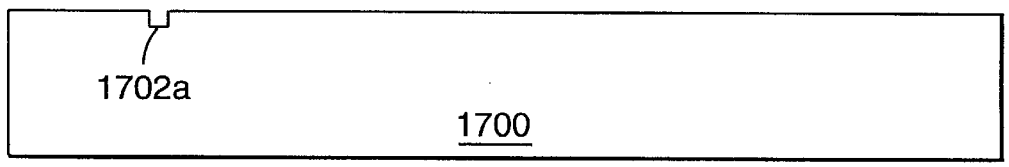
FIGS. 17A–17F illustrate cross-sections through a substrate subjected to laser ablation at various stages of ablation.

The substrate 1700 illustrated in FIG. 17A is illustrated to have a first ablation region 1702a, created by illuminating the mask 1600 and positioning the substrate 1700 so that the ablation region 1702a lies below the first aperture 1602. The substrate 1700 is then stepped by one aperture spacing, and re-exposed to the ablating light from the laser. Each exposure to the light removes a specific thickness of substrate material. For example, where the substrate material is PMMA or a polyimide, the exposing laser may be a krypton fluoride laser operating at 248 nm, although other wavelengths may also be useful. The ablation depth typically lies in the range 0.1 to 1 microns where the energy density (fluence) of the ablating light on the substrate 1700 is in the range 300 mJ cm$^{-2}$ to 1000 mJ cm$^{-2}$. It should be appreciated that different ablation depths may be obtained using different materials and different fluences of ablating light.

Figure 17B:
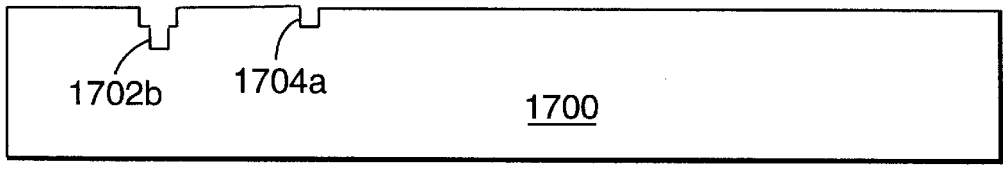

FIG. 17B illustrates the substrate 1700 after the substrate 1700 has been stepped and illuminated for a second time. The first ablation region 1702b now has a contour corresponding to successive ablation steps using apertures 1602 and then 1604. The second ablation region 1704a shows a contour corresponding to the first aperture 1602 in the pattern mask 1600.

Figure 17C:
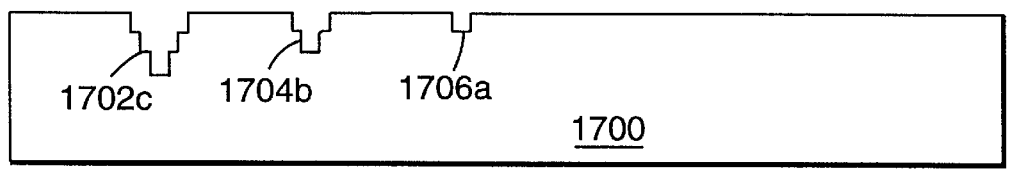
Figure 17D:
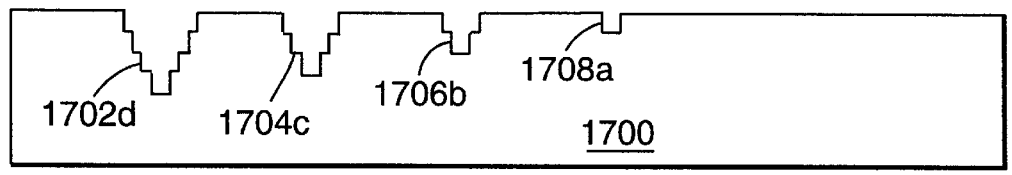

After stepping once more, and illuminating the surface of the substrate 1700, the resulting ablation patterns are shown in FIG. 17C. Here, the first ablation region 1702c displays a contour corresponding to successive ablations through apertures 1602, 1604 and 1606. The second ablation region 1704b has a contour corresponding to successive ablation pulses through aperture 1602 and 1604. The third ablation region 1706a illustrates a contour corresponding to a light ablation pulse passing through aperture 1602.

After a further step, the ablation step is repeated. Consequently, the first ablation region 1702d now includes a contour corresponding to the fourth aperture 1608, the second ablation region 1704c includes a contour corresponding to the third aperture 1606, the third ablation region 1706b includes a contour corresponding to the second aperture 1604 and the fourth ablation region 1708*a* includes a contour corresponding to the first aperture 1602.

Figure 17E:
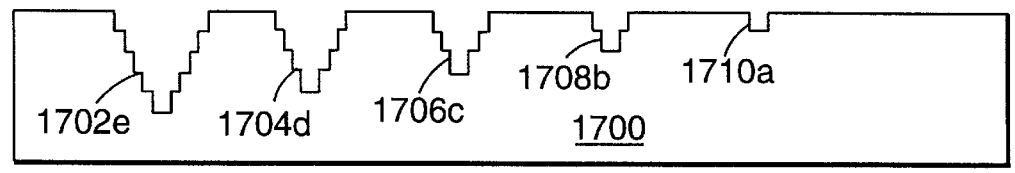

The step and repeat process is continued. For example, the substrate 1700 illustrated in FIG. 17E illustrates the next step, where the first ablation region 1702*e* now has a contour further corresponding to the fifth aperture 1610. The second, third and fourth ablation regions 1704*d*, 1706*c*, and 1708*b* now include contours corresponding to the fourth, third and second apertures 1608, 1606, and 1604, respectively. A fifth ablation region 1710*a* is started, corresponding to light passing through apertures 1602.

Figure 17F:
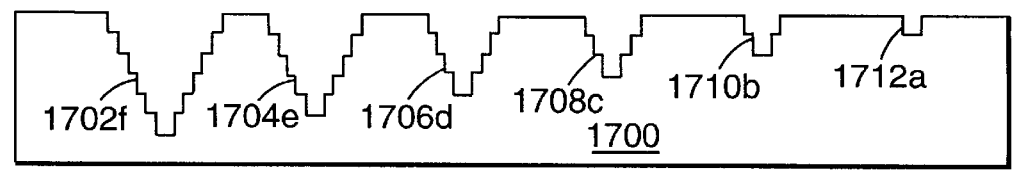

Finally, in FIG. 17F, the first ablation region 1702*f* includes a contour corresponding to each of the apertures 1602, 1604, 1606, 1608, 1610, and 1612 in sequence. The other ablation regions 1704*e*, 1706*d*, 1708*c*, 1710*b*, and 1712*a* each include contours corresponding to the apertures corresponding to the apertures through which light has illuminated the respective ablation portions.

It will be appreciated that by combining apertures of different sizes and/or shapes, ablation regions may be constructed in the substrate having specific contours that may then be used in a replication master. It should further be appreciated that, in addition to the process illustrated in FIGS. 17A–17F, in which the ablation regions are fabricated from the inside to the outside, from small mask dimensions to large mask dimensions, the ablation regions may also be formed from the outside in, in other words, starting with a mask aperture of large dimensions and working down to smaller dimensions. Furthermore, it may be possible to use a series of apertures where the dimensions do not monotonically increase, but where the dimensions between adjacent apertures either increase or decrease.

In the formation of a replication master using a laser ablation technique as discussed herein, the substrate is typically formed from polyimide and is ablated using light at 248 nanometers. The laser ablation fluence is typically in the range 600 to 700 mJ cm$^{-2}$, resulting in an ablation depth of approximately 0.25 microns per pulse. Where each lens in the lens array has a dimension in the order of 100 to 200 microns, many ablation layers need to be removed to produce the desired contour in the ablation region. Consequently, several hundred different mask apertures may be used to expose each ablation region. The roughness of the ablation region is reduced where the edge between adjacent ablation portions, caused by the edge of a mask, is exposed several times to light. Therefore, the "inside-out" approach of forming an ablated contour starting with a small aperture and working up to a large aperture, produces a smoother surface than where the ablation region is started with a large aperture, working down to a smaller aperture.

The laser ablation technique permits the fabrication of a replication master that can be used for replicating a spherical lenses, aspheric lenses, half lenses, or lenses having other outlines and shapes, and also may be used to manufacture lenses having their optical axes located at any particular position relative to the lens outline.

Other methods may be used to generate the lens master mold, including, but not limited to, diamond turning, photolithography, and overlapping drilled holes.

Figure 21:
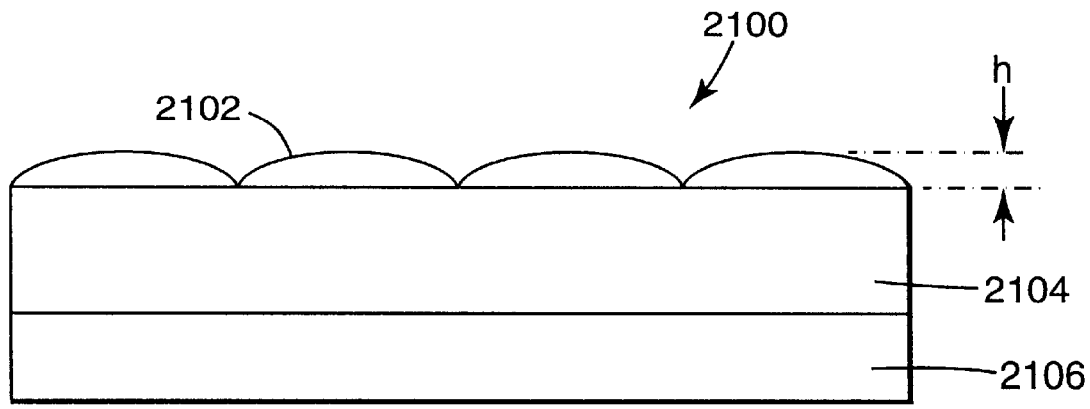
FIG. 21 schematically illustrates a cross-sectional construction of a sample screen assembly according to the present invention.

A screen assembly having a lens array was fabricated, and the results summarized as follows. The structure of the screen assembly was as shown in FIG. 21. The assembly 2100 had a lens array film 2102 formed on a polycarbonate substrate 2104, type DE 6-2 produced by Bayer, 250 $\mu$m thick. The polycarbonate substrate 2104 was then laminated to a layer of polarizer film, obtainable from Polaroid Corp.

The lens array film 2102 was formed from an acrylate and had a refractive index of 1.51. The lenses on the film 2102 were regular hexagons, with a center-to-center spacing of 60 $\mu$m, and the distance from the center of the hexagon to one of the corners was 45 $\mu$m. The viewing angles for the horizontal and vertical directions were similar. The focal length of each lens was approximately 134 $\mu$m, and the height of each lens, h, was approximately 27 $\mu$m.

The lens array film 2102 was formed using a cast and cure method on one surface of the polycarbonate substrate 2104. The two surfaces of the polycarbonate substrate 2104 had a roughened matte finish, one side being rougher than the other. The lens array film 2102 was formed on the surface having the rougher matte finish.

Figure 22:
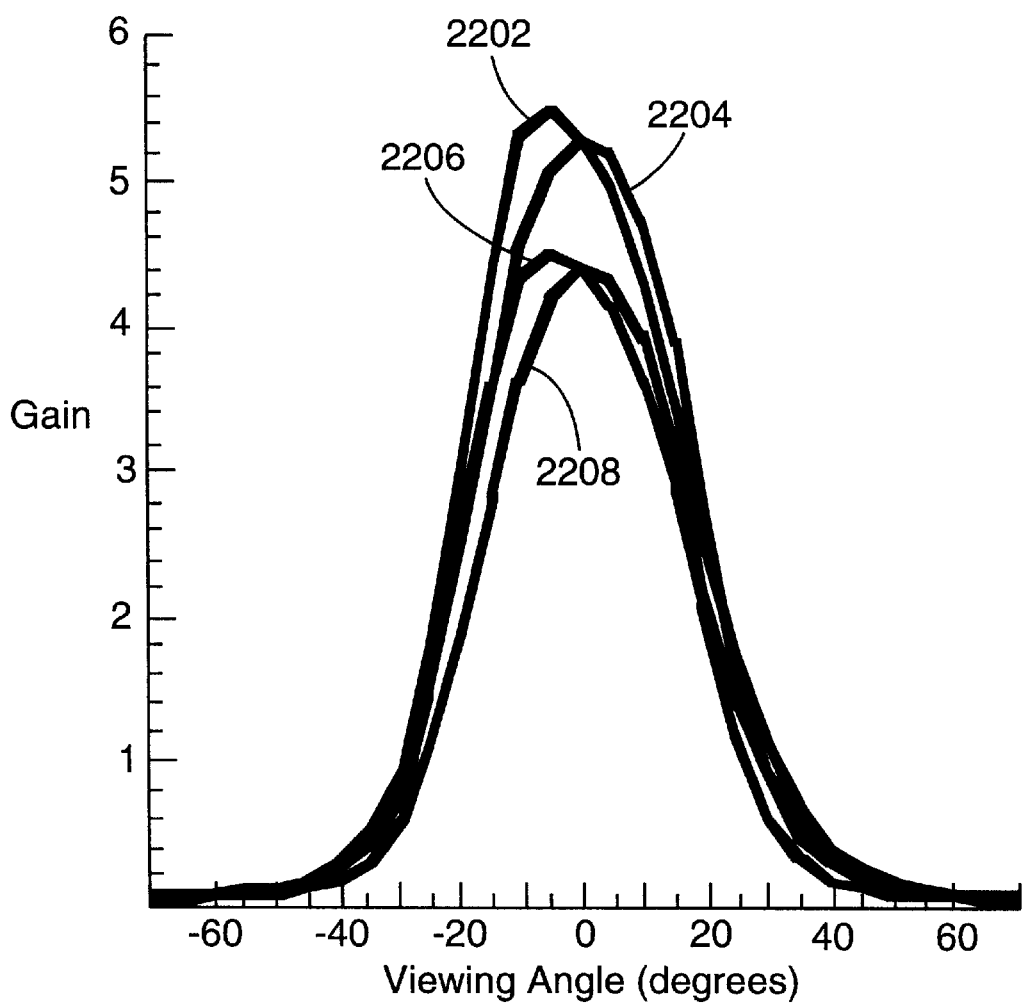
FIG. 22 illustrates measurements of the optical gain of the screen assembly illustrated in FIG. 21.

The gain of the sample was measured, using polarized light, as a function of angle in the horizontal and vertical directions before the substrate 2104 was laminated to the polarizer 2106, and the results are shown in FIG. 22. The gain in the horizontal direction is shown as curve 2202 and the gain in the vertical direction is shown as curve 2204. The widths of curves 2202 and 2204 are approximately equal. However, the curve of gain measured in the horizontal direction 2202 appears slightly displaced relative to the curve 2204. It is believed that this displacement is a result of a slight asymmetry in the lenses that resulted from peeling the lens array film from the mold after the cast and cure process. This asymmetry may be avoided, for example, by using different fabrication methods, or by ensuring an easier release from the mold.

The gain was also measured in the horizontal and vertical directions after the substrate 2104 was laminated to the polarizer 2106. Curve 2206 shows the gain in the horizontal direction and curve 2208 shows the curve measured for angles in the vertical direction. The gain of curves 2206 and 2208 is slightly reduced relative to the gain for curves 2202 and 2204. This is to be expected since the light does not pass through the polarizer 2106 in a single direction, but some light passes through the polarizer 2106 at a dispersed angle, for which the transmission through the polarizer is less than maximum.

As noted above, the present invention is applicable to rear projection screens, and is believed to be particularly applicable to screens used in applications requiring an asymmetric viewing angle. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A light dispersing screen, comprising:
    a first film having a first surface, a portion of the first surface defining a plurality of non-lenticular lenses;
    wherein light passing through at least one of the non-lenticular lenses is formed into an image and is asymmetrically diverged so that light entering the first film in a direction substantially parallel to a film axis has a downward viewing angle different from an upward viewing angle relative to the film axis or has a leftward viewing angle different from a rightward viewing angle relative to the film axis.

2. A screen as recited in claim 1, wherein the light passing through the non-lenticular lenses is formed into virtual images.

3. A screen as recited in claim 1, wherein the light passing through the non-lenticular lenses is formed into real images.

4. A screen as recited in claim 1, wherein light diverges in a first plane formed by a z-axis parallel to one of the optical axes and an x-axis orthogonal to the z-axis, and in a second plane formed by the z-axis and a y-axis orthogonal to both the x-axis and the z-axis, and an angle of light divergence in the first plane is larger than an angle of divergence in the second plane.

5. A screen as recited in claim 1, at least one of the non-lenticular lenses has a substantially non-circular outer perimeter.

6. A screen as recited in claim 1, wherein the non-lenticular lenses are contiguously arranged in a periodic array.

7. A screen as recited in claim 6, wherein at least one of the non-lenticular lenses has a first optical axis, a first lens dimension in a first direction orthogonal to the first optical axis being larger than a second lens dimension in a second direction orthogonal to the first optical axis and the first direction.

8. A screen as recited in claim 1, wherein an optical axis of one of the plurality of non-lenticular lenses is offset from a center point of the one of the plurality of non-lenticular lenses.

9. A screen as recited in claim 8, wherein the non-lenticular lenses are contiguously arranged in an array relative to first and second, mutually perpendicular, directions, and the optical axis of the one of the plurality of lenses is offset from the center point of the lens relative to both the first and second directions.

10. A screen as recited in claim 1, wherein one of the plurality of non-lenticular lenses is an astigmatic lens.

11. A screen as recited in claim 1, wherein one of the non-lenticular lenses is a positive lens.

12. A screen as recited in claim 1, wherein one of the non-lenticular lenses is a negative lens.

13. A screen as recited in claim 1, further comprising a light dispersing film disposed with the first film to disperse light transmitted by the first film.

14. A screen as recited in claim 13, wherein the light dispersing film includes a bulk diffuser film.

15. A screen as recited in claim 1, further comprising light diffusing particles disposed within the first film.

16. A screen as recited in claim 1, wherein the first film further comprises a light dispersing surface.

17. A screen as recited in claim 1, further comprising a focusing element disposed relative to an input side of the first film so as to redirect light passing into the first film.

18. A screen as recited in claim 1, wherein the plurality of lenses are arranged contiguously in a non-periodic pattern.

19. A screen as recited in claim 1, further comprising an image light projector disposed to project an image onto a surface of the first film.

20. A rear projection screen assembly, comprising:
a first layer having a first surface, a portion of the first surface defining a plurality of non-lenticular lenses; and
a symmetric light disperser optically coupled to the first surface to disperse light transmitted by the first layer;
wherein light passing through at least one of the non-lenticular lenses is formed into an image and is asymmetrically diverged, so that light entering the first film in a direction substantially parallel to a film axis has a downward viewing angle different from an upward viewing angle relative to the film axis or has a leftward viewing angle different from a rightward viewing angle relative to the film axis.

21. A screen assembly as recited in claim 20, wherein the disperser includes a bulk diffuser layer.

22. A screen assembly as recited in claim 20, wherein the symmetric light disperser includes a plurality of light dispersing particles disposed within the first layer.

23. A screen assembly as recited in claim 20, wherein the symmetric light disperser includes a dispersing surface on the first layer.

24. A screen assembly as recited in claim 20, wherein the non-lenticular lenses are elongated relative to a direction perpendicular to an optical axis of one of the non-lenticular lenses.

25. A screen assembly as recited in claim 20, wherein one of the non-lenticular lenses has an optical axis offset from a center point of the one of the non-lenticular lenses.

26. A screen assembly as recited in claim 20, wherein at least one of the non-lenticular lenses is astigmatic.

27. A screen assembly as recited in claim 20, further comprising a polarizer layer disposed to transmit light transmitted by the first layer having a first polarization.

28. A screen assembly as recited in claim 20, further comprising an image light source disposed to illuminate a surface of the first layer with image light.

29. A screen assembly as recited in claim 28, wherein the image light source transmits light polarized in a first polarization direction and further comprising a polarizing layer disposed to transmit light having the first polarization direction and transmitted by the first layer.

30. A screen assembly as recited in claim 28, further comprising a focusing element disposed to redirect light passing from the image light source to the first layer.

31. A light dispersing screen, comprising:
a first film having a first surface defining light imaging and diverging means for forming an image and for asymmetrically diverging light passing through the first film, so that light entering the first film in a direction substantially parallel to a film axis has a downward viewing angle different from an upward viewing angle relative to the film axis or has a leftward viewing angle different from a rightward viewing angle relative to the film axis.

32. A screen as recited in claim 31, wherein the light imaging and diverging means has an outer perimeter elongated in one direction orthogonal to the first optical axis and shortened in another direction orthogonal to the one direction and to the first optical axis.

33. A screen as recited in claim 31, wherein the first optical axis is offset from a center point of the light imaging and diverging means.

34. A screen as recited in claim 31, wherein the light imaging and diverging means is an astigmatic lens.

35. A light dispersing film, comprising:
a first film having a first surface, a portion of the first surface defining a plurality of lenses, all of the lenses having dimensions less than one twentieth of a selected dimension of the first film;
wherein light passing through at least one of the lenses is formed into an image and is asymmetrically diverged, and the selected dimension is selected from film length and film width, so that light entering the first film in a direction substantially parallel to a film axis has a downward viewing angle different from an upward viewing angle relative to the film axis or has a leftward viewing angle different from a rightward viewing angle relative to the film axis.

36. A film as recited in claim 35, wherein light diverges in a first plane formed by a z-axis parallel to one of the optical axes and an x-axis orthogonal to the z-axis, and in a second plane formed by the z-axis and a y-axis orthogonal to both the x-axis and the z-axis, an angle of light divergence in the first plane being larger than an angle of divergence in the second plane.

37. A film as recited in claim 35, wherein a dimension of at least one of the lenses is elongated along a first axis parallel to the film.

38. A film as recited in claim 35, wherein an optical axis of one of the lenses is offset from a center point of the one of the lenses.

39. A film as recited in claim 35, wherein one of the plurality of non-lenticular lenses is an astigmatic lens.

40. A film as recited in claim 35, wherein one of the lenses is a positive lens.

41. A film as recited in claim 35, wherein one of the lenses is a negative lens.

42. A film as recited in claim 35, further comprising a light dispersing film disposed with the first film to disperse light transmitted by the first film.

43. A film as recited in claim 42, wherein the light dispersing film includes a bulk diffuser film.

44. A film as recited in claim 35, further comprising light diffusing particles disposed within the first film.

45. A film as recited in claim 35, wherein the first film further comprises a light dispersing surface.

46. A film as recited in claim 35, further comprising a focusing element disposed relative to an input side of the first film so as to redirect light passing into the first film.

47. A film as recited in claim 35, further comprising an image light projector disposed to project an image onto a surface of the first film.

* * * * *